US012715478B2

(12) United States Patent
Choudhury et al.

(10) Patent No.: US 12,715,478 B2
(45) Date of Patent: Aug. 25, 2026

(54) GOAL-BASED MOTION FORECASTING

(71) Applicant: Aurora Operations, Inc., Mountain View, CA (US)

(72) Inventors: Sanjiban Choudhury, Ithaca, NY (US); Sumit Kumar, Sunnyvale, CA (US); Micol Marchetti-Bowick, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 291 days.

(21) Appl. No.: 18/471,690

(22) Filed: Sep. 21, 2023

(65) Prior Publication Data

US 2024/0217558 A1 Jul. 4, 2024

Related U.S. Application Data

(63) Continuation of application No. 18/147,316, filed on Dec. 28, 2022, now Pat. No. 11,801,871.

(51) Int. Cl.
*B60W 60/00* (2020.01)
*G06Q 50/40* (2024.01)

(52) U.S. Cl.
CPC ... *B60W 60/00272* (2020.02); *B60W 2552/53* (2020.02); *B60W 2554/4041* (2020.02);
(Continued)

(58) Field of Classification Search
CPC ....... B60W 60/00272; B60W 60/0011; B60W 2552/53; B60W 2554/4041;
(Continued)

(56) References Cited

U.S. PATENT DOCUMENTS 10,310,087 B2 6/2019 Laddha et al.
10,809,361 B2 10/2020 Vallespi-Gonzalez et al.
(Continued)

FOREIGN PATENT DOCUMENTS

CN 113989782 A 11/2021
WO WO 2022035602 A2 2/2022

OTHER PUBLICATIONS

Ballan et al., "Knowledge Transfer for Scene-Specific Motion Prediction", European Conference on Computer Vision, 2016, pp. 697-713.

(Continued)

*Primary Examiner* — David P. Merlino
(74) *Attorney, Agent, or Firm* — Dority & Manning, P.A.

(57) ABSTRACT

Example aspects of the present disclosure relate to an example computer-implemented method for predicting the intent of actors within an environment. The example method includes obtaining state data associated with a plurality of actors within the environment and map data indicating a plurality of lanes of the environment. The method includes determining a plurality of potential goals each actor based on the state data and the map data. The method includes processing the state data, the map data, and the plurality of potential goals with a machine-learned forecasting model to determine (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal.

20 Claims, 19 Drawing Sheets

(52) U.S. Cl.
CPC ............... *B60W 2554/4044* (2020.02); *B60W 2554/4045* (2020.02); *B60W 2556/00* (2020.02); *G06Q 50/40* (2024.01)

(58) Field of Classification Search
CPC . B60W 2554/4044; B60W 2554/4045; B60W 2556/00; G06Q 50/40
See application file for complete search history.

(56) References Cited

U.S. PATENT DOCUMENTS

| | | | | |
|---|---|---|---|---|
| 11,370,423 | B2 | 6/2022 | Casas et al. | |
| 11,577,722 | B1 | 2/2023 | Packer et al. | |
| 2016/0189035 | A1 | 6/2016 | Shakeri et al. | |
| 2018/0373247 | A1 | 12/2018 | Wang et al. | |
| 2019/0025841 | A1 | 1/2019 | Haynes et al. | |
| 2019/0302767 | A1 | 10/2019 | Sapp et al. | |
| 2019/0333381 | A1 | 10/2019 | Shalev-Shwartz et al. | |
| 2019/0382007 | A1 | 12/2019 | Casas et al. | |
| 2020/0089238 | A1 | 3/2020 | McGill et al. | |
| 2020/0209860 | A1 | 7/2020 | Zhang | |
| 2020/0298891 | A1 | 9/2020 | Liang et al. | |
| 2020/0353917 | A1 | 11/2020 | Leitermann et al. | |
| 2021/0139026 | A1 | 5/2021 | Phan et al. | |
| 2021/0146963 | A1* | 5/2021 | Li | G06N 3/09 |
| 2021/0339741 | A1* | 11/2021 | Rezvan Behbahani | B60W 30/0956 |
| 2021/0370980 | A1 | 12/2021 | Ramamoorthy et al. | |
| 2021/0380142 | A1 | 12/2021 | Ramamoorthy et al. | |
| 2022/0017122 | A1 | 1/2022 | Malla et al. | |
| 2022/0153315 | A1 | 5/2022 | Zeng et al. | |
| 2022/0169244 | A1 | 6/2022 | Sun et al. | |
| 2022/0169278 | A1 | 6/2022 | Refaat et al. | |
| 2022/0219727 | A1 | 7/2022 | Floor et al. | |
| 2022/0266822 | A1 | 8/2022 | Nardi et al. | |
| 2022/0402485 | A1 | 12/2022 | Kobilarov et al. | |
| 2023/0162470 | A1* | 5/2023 | Garimella | G06V 10/764 382/103 |
| 2024/0004961 | A1* | 1/2024 | Tairbekov | G06F 18/214 |

OTHER PUBLICATIONS

Chen et al., "Multi-View 3D Object Detection Network for Autonomous Driving", 2017 IEEE Conference on Computer Vision and Pattern Recognition, 2017, p. 3.
Dai et al., "R-FCN: Object Detection Via Region-Based Fully Convolutional Networks". Advances in Neutral Information Processing Systems, 2016, pp. 379-387.
Engelcke et al., "Vote3Deep: Fast Object Detection in 3D Point Clouds Using Efficient Convolutional Neural Networks", 2017 IEEE International Conference on Robotics and Automation (IRCA), 2017, pp. 1355-1361.
Fathi et al., "Learning to Recognize Daily Actions Using Gaze", European Conference on Computer Vision, 2012, pp. 314-327.
Geiger et al., "Vision Meets Robotics: The KITTI Dataset", The International Journal of Robotics Research, 2013, pp. 1231-1237.
Girshick et al., "Rich Feature Hierarchies for Accurate Object Detection and Semantic Segmentation", Proceedings of the IEEE Conference on Computer Vision and Pattern Recognition, 2014, pp. 580-587.
He et al., "Deep Residual Learning for Image Recognition", Proceedings of the IEEE Conference on Computer Vision and Pattern Recognition, 2016, pp. 770-778.
Hoermann et al., "Dynamic Occupancy Grid Prediction for Urban Autonomous Driving: A Deep Learning Approach with Fully Automatic Labeling", 2018 IEEE International Conference on Robotics and Automation (IRCA), 2017, pp. 2056-2063.
Howard et al., "MobileNets: Efficient Convolutional Neural Networks for Mobile Vision Applications", arXiv: 1704.04861, 2017.
Hu et al., "Probabilistic Prediction of Vehicle Semantic Intention and Motion", 2018 IEEE Intelligent Vehicles Symposium (IV), 2018, pp. 307-313.
Iandola et al., "SqueezeNet: AlexNet-level Accuracy With 50x Fewer Parameters And <0.5 Mb Model Size", arXiv: 1602.07360, 2017.
Jain et al., "Car That Knows Before You Do: Anticipating Maneuvers Via Learning Temporal Driving Models", Proceedings of the IEEE International Conference on Computer Vision, 2015, pp. 3182-3190.
Kim et al., "Prediction of Drivers Intention of Lane Change by Augmenting Sensor Information Using Machine Learning Techniques", Sensors, 2017.
Kingma et al., "Adam: A Method for Stochastic Optimization", Machine Learning, 2014.
Lee et al., "Desire: Distant Future Prediction in Dynamic Scenes with Interacting Agents", 2017 IEEE Conference on Computer Vision and Pattern Recognition (CVPR), 2017, pp. 2165-2174.
Lewis et al., "Sensor Fusion Weighting Measures in Audio-Visual Speech Recognition", Proceedings of the 27th Australasian Conference on Computer Science, 2004, pp. 305-304.
Li et al., "Vehicle Detection From 3D Lidar Using Fully Convolutional Network", arXiv: 1608.07916, 2016.
Lin et al., "Focal Loss for Dense Object Detection", 2017 IEEE International Conference on Computer Vision (ICCV), 2017, pp. 2999-3007.
Liu et al., "SSD: Single Shot Multibox Detector", European Conference on Computer Vision, 2016, pp. 21-37.
Luo et al., "Fast and Furious: Real Time End-to-End 3d Detection, Tracking and Motion Forecasting with a Single Convolutional Net", The IEEE Conference on Computer Vision and Pattern Recognition (CVPR), 2018, pp. 3569-3577.
Luo et al., "Understanding the Effective Receptive Field in Deep Convolutional Neural Networks", Advances in Neural Information Processing Systems, 2016, pp. 4898-4906.
Ma et al., "Forecasting Interactive Dynamics of Pedestrians with Fictitious Play", 2017 IEEE Conference on Computer Vision and Pattern Recognition (CVPR), 2017, pp. 4643-4644.
Park et al., "Egocentric Future Localization", Proceedings of the IEEE Conference on Computer Vision and Pattern Recognition, 2016, pp. 4697-4705.
Phillips et al., "Generalizable Intention Prediction of Human Drivers at Intersections", Intelligent Vehicles Symposium (IV), 2017, pp. 1665-1670.
Qi et al., "Pointnet: Deep learning on point sets for 3d classification and segmentation", Proceedings of the IEEE Conference on Computer Vision and Pattern Recognition, 2017, pp. 652-660.
Redmon et al., "You Only Look Once: Unified, Real-Time Object Detection", Proceedings of the IEE Conference on Computer Vision and Pattern Recognition, 2016, pp. 779-788.
Ren et al., "Faster R-CNN: Towards Real-Time Object Detection with Region Proposal Networks", Advances in Neural Information Processing Systems, 2015, pp. 91-99.
Simon et al., "Complex-YOLO; Real-Time 3D Object Detection on Point Clouds", European Conference on Computer Vision, 2018, pp. 197-209.
Snoek et al., "Early Versus Late Fusion in Semantic Video Analysis", Proceedings of the 13th Annual ACM International Conference on Multimedia, 2005, pp. 399-402.
Streubel et al., "Prediction of Driver Intended Path At Intersections", Intelligent Vehicles Symposium (IV), 2014, pp. 134-139.
Sutton et al., "Reinforcement Learning: An Introduction", MIT Press, 1998, 179 pages.
Tran et al., "Learning Spatiotemporal Features With 3D Convolutional Networks", 2015 IEEE International Conference on Computer Vision (ICCV), 2015, pp. 4489-4497.
Yang et al., "Pixor: Real-Time 3D Object Detection from Point Clouds", The IEEE Conference on Computer Vision and Pattern Recognition (CVPR), 2018, pp. 7652-7660.
Zhang et al., "Sensor Fusion for Semantic Segmentation of Urban Scenes", 2015 IEEE International Conference on Robotics and Automation (ICRA). 2015, pp. 1850-1857.
International Search Report and Written Opinion for Application No. PCT/US2023/085300, mailed May 28, 2024, 13 pages.

* cited by examiner

900

1500

GOAL-BASED MOTION FORECASTING

PRIORITY CLAIM

The present application is a continuation of U.S. application Ser. No. 18/147,316 having a filing date of Dec. 28, 2022. Applicant claims priority to and the benefit of such application and incorporates such application herein by reference in its entirety.

BACKGROUND

An autonomous platform can process data to perceive an environment through which the autonomous platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The present disclosure describes improved intent prediction techniques that can be leveraged by an autonomous platform for motion forecasting and, ultimately, motion planning. The improved intent prediction techniques include a machine-learned model (e.g., a graph neural network) that is trained to generate a number of discrete intent and continuous motion outputs based on historical actor observations and map geometry for a traffic scene. The outputs include (i) a goal probability (e.g., a probability that an actor on a roadway will follow a nominal path), (ii) an interaction probability (e.g., a probability that the actor will yield or reverse yield to another actor), and (iii) a continuous goal-based trajectory for an actor. An autonomous platform such as, for example, an autonomous vehicle can use the outputs to better anticipate the future motion of actors within an environment while planning its motion. At times, an additional machine-learned model (e.g., a typed graph neural network) can be used to condition the outputs on an anticipated motion of the autonomous platform. The techniques described herein can increase the speed, efficiency, and accuracy for forecasting the future motion of dynamic actors in a traffic scene which can, in turn, lead to improved decisions and reaction times to the dynamic actors when planning autonomous platform motion.

More particularly, the present disclosure is directed to a machine-learned forecasting model for forecasting actors' future behavior in a traffic scene based on state data and map data for an environment. The actors include both the autonomous platform and other dynamic objects within the traffic scene. The state data can include present and historical observations such as a position, velocity, direction of travel, etc. for each actor in the scene. The map data can identify a number of lanes and different lane features for a respective plurality of lanes in the traffic scene. The model can determine a number of potential goals for respective actors in the traffic scene based on an actor's current state and the map data. Each goal can include a short-term goal destination (e.g., a potential destination in the next five seconds) and a goal path (e.g., a plurality of waypoints along one or more traffic lanes) to the goal destination that is available to a respective actor based on the actor's position within the traffic scene. The machine-learned forecasting model can process the state data and map data to determine the probability that an actor will (i) follow a goal path and/or (ii) interact with another actor within the traffic scene while following the goal path. In addition, the model can determine (iii) a continuous trajectory for the actor that is conditioned on the goal path.

The machine-learned forecasting model can include a graph neural network with a plurality of nodes and edges. The plurality of nodes can include one or more goal nodes of a goal node type and one or more actor nodes of an actor node type. The plurality of edges can include one or more actor-goal edges of an actor-goal edge type and one or more goal-goal edges of a goal-goal edge type. An actor-goal edge can connect a particular actor to a potential goal for the actor and a goal-goal edge can connect two goals that are associated with a "shared space" (e.g., a space at which two corresponding goal paths intersect) and therefore could lead to an interaction between two actors respectively performing the two goals.

The plurality of nodes and edges can respectively include feature representations that are encoded using different features from the state data and map data based on their respective node type and edge type. For example, an actor node can include an actor feature representation that is encoded based on a current state and one or more historical states of a particular actor. A goal node can include a goal feature representation encoded based on waypoint information for a corresponding goal path. An actor-goal edge can include an actor-goal feature representation encoded based on actor state information in a path tangent frame. Also, a goal-goal edge can include a goal-goal feature representation encoded based on actor state information for two actors that may perform two goals associated with a shared space. Multiple rounds of message passing can be performed to update the feature representations based on information from neighboring nodes and edges. The outputs can be determined from the updated feature representations.

The machine-learned forecasting model can be trained using labeled training data. The labeled training data can include auto-labeled ground-truth information that identifies (i) a ground-truth goal path followed by one or more actors in the traffic scene, (ii) whether an interaction occurred, and (iii) a type of interaction that occurred (e.g., which actor yielded, etc.). The ground truth information can be determined algorithmically based on future sensor observations of the traffic scene. The machine-learned forecasting model can be trained by a loss function that minimizes the distance between the outputs and the ground-truth information.

Aspects of the present disclosure can provide a number of technical improvements to robotics, machine-learning, and intent prediction technologies. The improved intent prediction techniques described herein can offer a technical solution to the technical problem of robotic anticipation of real-time dynamic object movement. By doing so, the systems and methods of the present disclosure can provide an improved approach for planning autonomous motion.

The systems and methods described herein can accumulate and utilize newly available information such as probabilistic goal-based paths for dynamic objects, probabilistic interaction relationships between the dynamic objects, and continuous trajectories conditioned on the probabilistic goal-based paths and/or interaction relationships to provide practical improvements to robotic, machine-learning, and robotic intent prediction technologies. Unlike previous intent prediction techniques, the systems and methods described herein train a machine-learned model to output a number of discrete intent and continuous motion outputs that can be used to accurately predict the motion of dynamic objects in an environment. In this manner, the systems and methods described herein can increase the speed, efficiency, and accuracy of future object location predictions. This, in turn, improves the functioning of robotic and machine-learning technologies by enabling an autonomous platform to anticipate the future motion of objects within its environment. Ultimately, the techniques disclosed herein result in more accurate, robust, and efficient object intent prediction techniques, thereby improving motion planning techniques and on road performance for a vast array of robotic or autonomous vehicle technologies.

For example, in an aspect, the present disclosure provides an example computer-implemented method. The example method includes obtaining state data associated with a plurality of actors within an environment of an autonomous vehicle and map data indicating a plurality of lanes of the environment. The method includes determining a plurality of potential goals including at least one potential goal for each actor of the plurality of actors based on the state data and the map data. A potential goal includes a potential destination location in the environment and a goal path to the potential destination location. The method includes processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal. The method includes initiating a motion of the autonomous vehicle based on the forecasted goal, the forecasted interaction, or the continuous trajectory for the respective actor.

In some implementations of the example method, the method includes determining a probability for each potential goal for the respective actor. The forecasted goal includes a respective potential goal that has a highest probability.

In some implementations of the example method, the state data is associated with at least one of a localization system or an inertial measurement unit of the autonomous vehicle.

In some implementations of the example method, the goal path of the potential goal includes a nominal path defined in the map data.

In some implementations of the example method, the map data includes a plurality of map features associated with the potential goal. In addition, the plurality of map features include a plurality of waypoints for the nominal path defined in the map data.

In some implementations of the example method, the forecasted interaction is further based on a potential goal for the different actor that intersects the forecasted goal for the respective actor in the environment.

In some implementations of the example method, the forecasted interaction includes a probability distribution over one or more interaction types between the respective actor and the different actor.

In some implementations of the example method, the probability of the forecasted interaction between the respective actor and the different actor is based on one or more distances between the respective actor and a shared space associated with the forecasted goal and the potential goal for the different actor.

In some implementations of the example method, the state data includes a plurality of actor states associated with the respective actor. The plurality of actor states are indicative of one or more positions, one or more velocities, or one or more headings for the respective actor at a current time and one or more historical times.

In some implementations of the example method, processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal includes: processing the state data, the map data, and the plurality of potential goals with a first portion of the machine-learned forecasting model to generate a plurality of feature embeddings corresponding to the plurality of actors and the plurality of potential goals; and processing the plurality of feature embeddings to determine the forecasted goal for the respective actor, the forecasted interaction between the respective actor and the different actor based on the forecasted goal, and the continuous trajectory for the respective actor based on the forecasted goal.

In some implementations of the example method, processing the state data, the map data, and the plurality of potential goals with a machine-learned forecasting model to determine (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal includes: performing one or more message passing rounds to generate a plurality of updated feature embeddings; and determining the forecasted goal, the forecasted interaction, and the continuous trajectory for the respective actor based on the plurality of updated feature embeddings.

In some implementations of the example method, the machine-learned forecasting model includes a graph neural network including a plurality of nodes and a plurality of edges, wherein the plurality of nodes include: (i) a plurality of actor nodes respectively corresponding to each actor of the plurality of actors; and (ii) a plurality of goal nodes respectively corresponding to each potential goal of the plurality of potential goals, wherein the plurality of edges include: (iii) one or more actor-goal edges respectively connecting a respective actor node and a respective goal node; and (iv) one or more goal-goal edges respectively connecting at least two goal nodes of the plurality of goal nodes.

In some implementations of the example method, the plurality of feature embeddings include an actor feature embedding corresponding to an actor node, a goal feature embedding corresponding to a goal node, an actor-goal feature embedding corresponding to an actor-goal edge, and a goal-goal feature embedding corresponding to a goal-goal edge.

In some implementations of the example method, processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal includes: processing at least one of the actor feature embedding or the actor-goal feature embedding to determine the forecasted goal for the respective actor; and processing the goal-goal feature embedding to determine the forecasted interaction between the respective actor and the different actor based on the forecasted goal.

In some implementations of the example method, the method includes receiving vehicle motion data for the autonomous vehicle. The vehicle motion data is indicative of a potential motion of the autonomous vehicle.

In some implementations of the example method, the method further includes generating a conditional feature embedding based on the potential motion of the autonomous vehicle.

In some implementations of the example method, the method further includes concatenating the conditional feature embedding with at least one of the plurality of feature embeddings.

In some implementations of the example method, the method further includes processing the plurality of feature embeddings with a machine-learned conditional prediction model to determine the forecasted goal, the forecasted interaction, and the continuous trajectory for the respective actor.

For example, in an aspect, the present disclosure provides an example computing system. The computing system includes one or more processors and one or more non-transitory computer-readable media storing instructions that are executable to cause the one or more processors to perform operations. The operations include obtaining state data associated with a plurality of actors within an environment of an autonomous vehicle and map data indicating a plurality of lanes of the environment. The operations include determining a plurality of potential goals including at least one potential goal for each actor of the plurality of actors based on the state data and the map data. A potential goal includes a potential destination location in the environment and a goal path to the potential destination location. The operations include processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal. The operations include initiating a motion of the autonomous vehicle based on the forecasted goal, the forecasted interaction, or the continuous trajectory for the respective actor In some implementations of the example computing system, processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal further includes determining a probability for each potential goal for the respective actor. The forecasted goal includes a respective potential goal that has a highest probability.

In some implementations of the example computing system, the goal path of the potential goal includes a nominal path defined in the map data.

In some implementations of the example computing system, the map data includes a plurality of map features associated with the potential goal. The plurality of map features include a plurality of waypoints for the nominal path defined in the map data.

For example, in an aspect, the present disclosure provides an example control system for an autonomous vehicle. The control system includes one or more processors; and one or more non-transitory computer-readable media storing instructions that are executable to cause the one or more processors to perform operations. The operations include obtaining state data associated with a plurality of actors within an environment of an autonomous vehicle and map data indicating a plurality of lanes of the environment. The operations include determining a plurality of potential goals including at least one potential goal for each actor of the plurality of actors based on the state data and the map data. A potential goal includes a potential destination location in the environment and a goal path to the potential destination location. The operations include processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal. The operations include initiating a motion of the autonomous vehicle based on the forecasted goal, the forecasted interaction, or the continuous trajectory for the respective actor.

In some implementations of the example control system, processing the state data, the map data, and the plurality of potential goals with a machine-learned forecasting model to determine: (i) a forecasted goal for a respective actor of the plurality of actors, (ii) a forecasted interaction between the respective actor and a different actor of the plurality of actors based on the forecasted goal, and (iii) a continuous trajectory for the respective actor based on the forecasted goal further includes determining a probability for each potential goal for the respective actor. The forecasted goal includes a respective potential goal that has a highest probability.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within autonomous robots, other autonomous platforms, and other computing systems.

Figure 1:
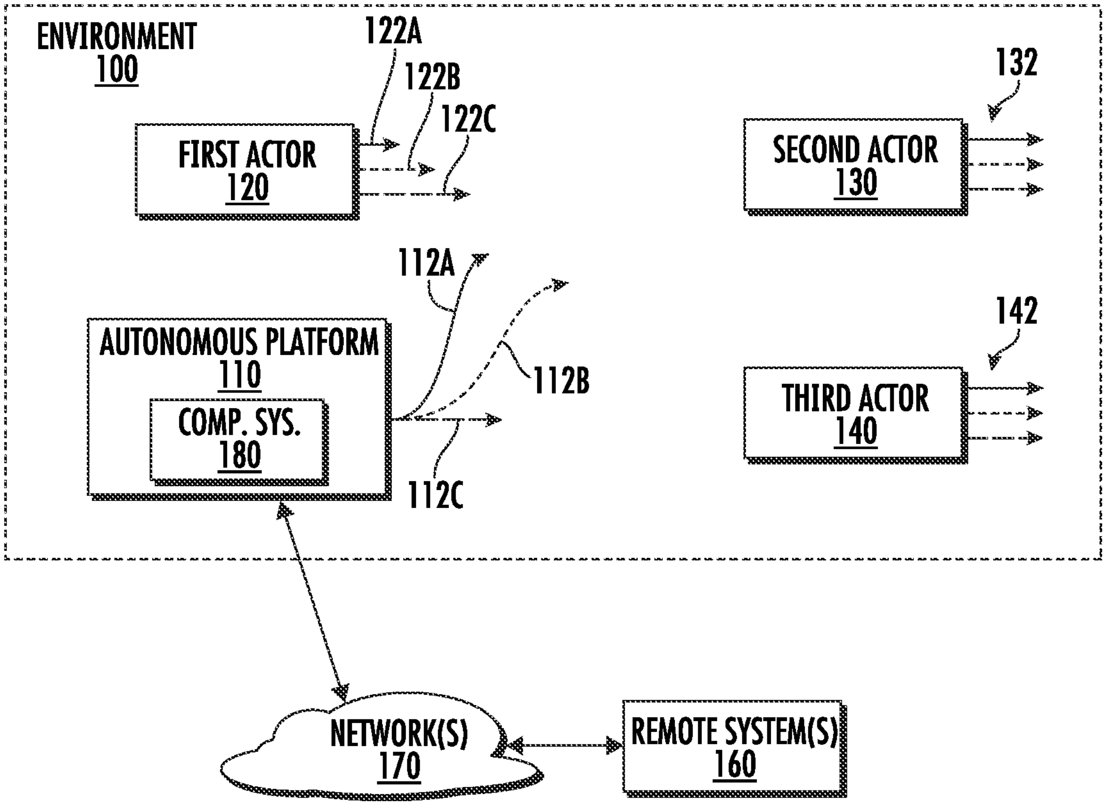
FIG. 1 is a block diagram of an operational scenario, according to some implementations of the present disclosure.

With reference to FIGS. 1-17, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system (s).

Figure 2:
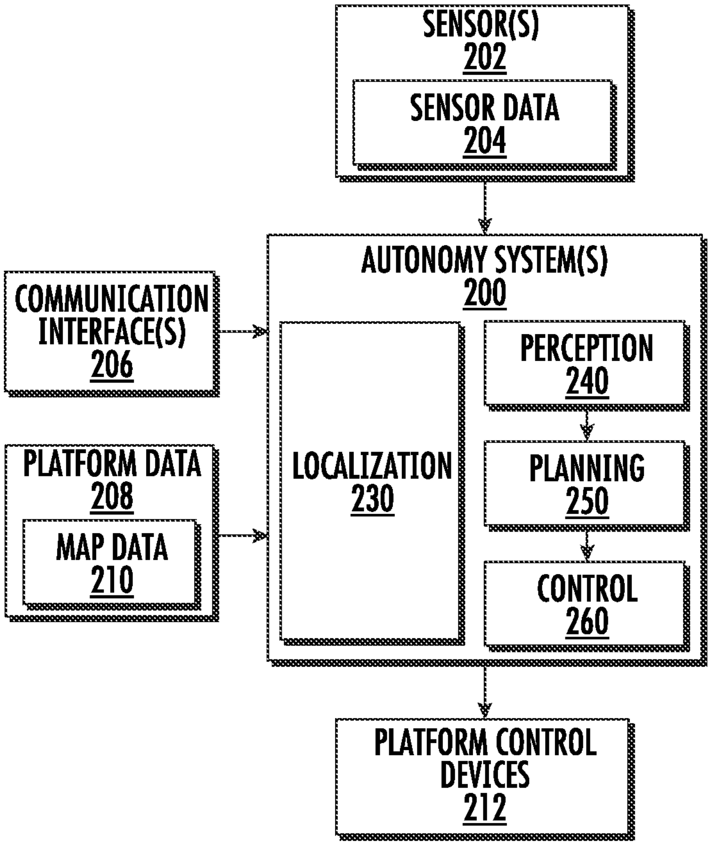
FIG. 2 is a block diagram of a system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 230). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally, or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally, or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal (s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
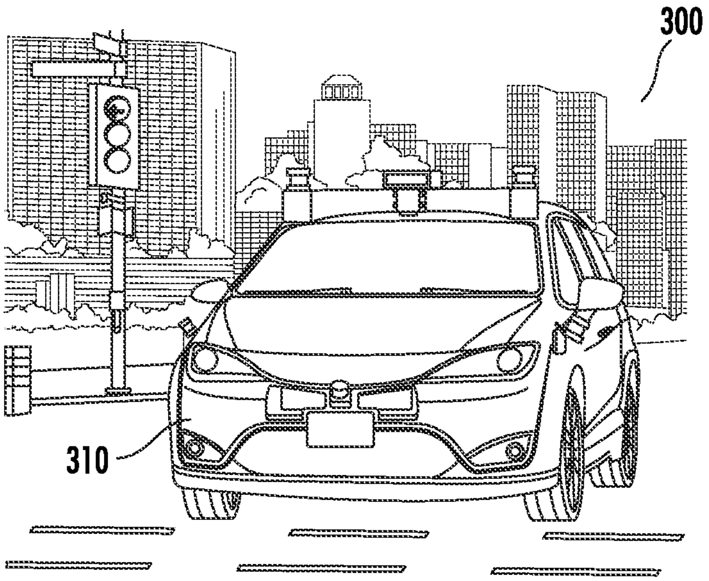
FIG. 3A is a representation of an operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
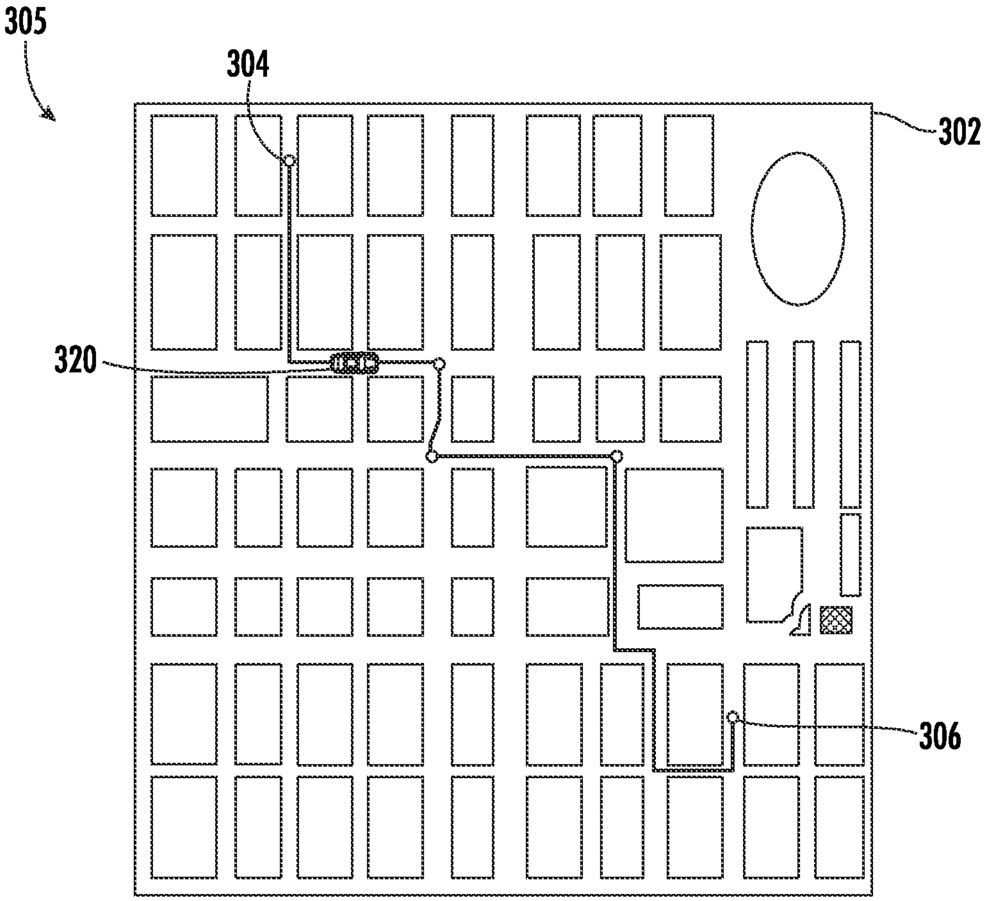
FIG. 3B is a representation of a map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
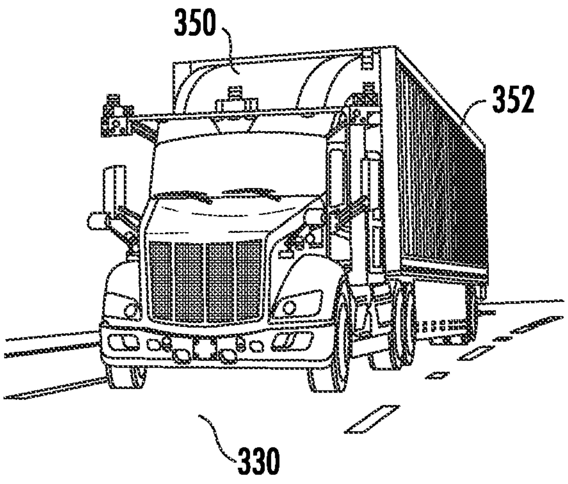
FIG. 3C is a representation of an operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
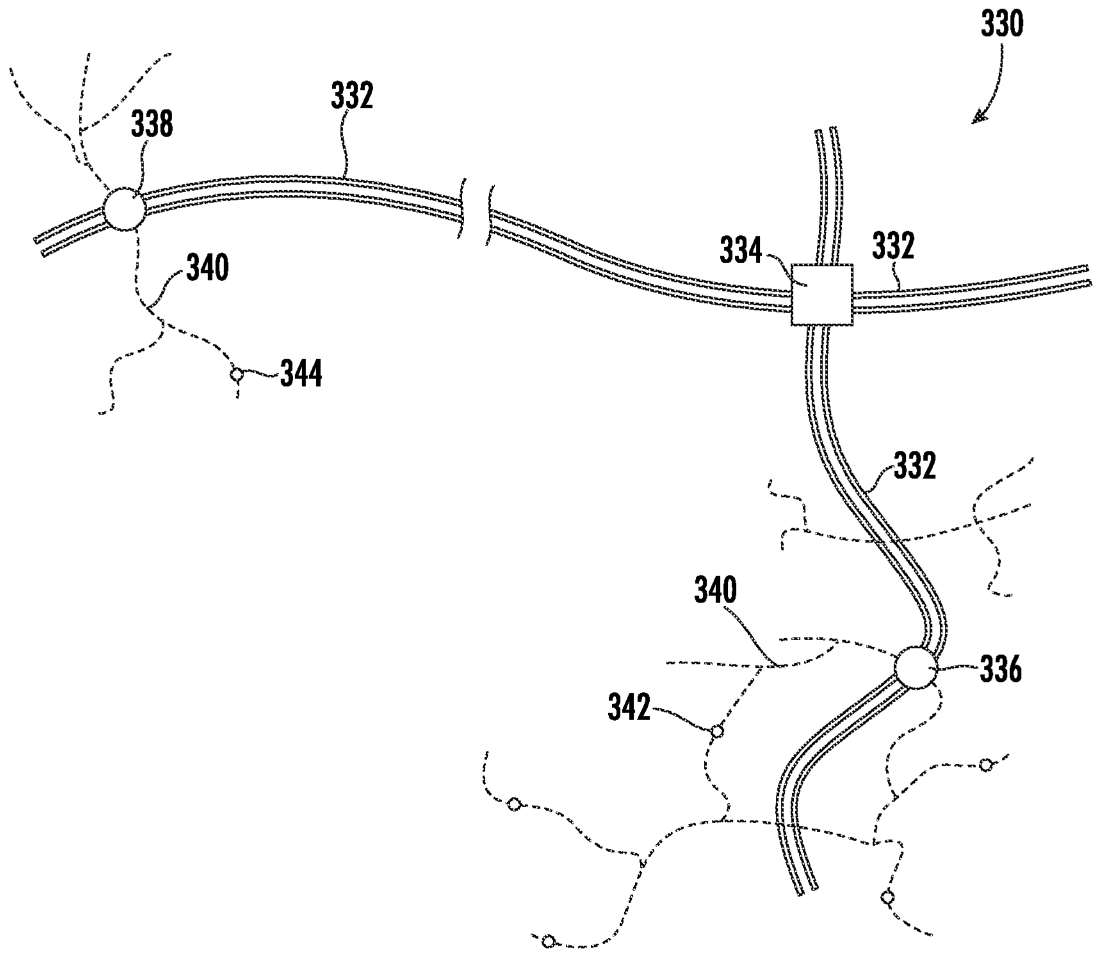
FIG. 3D is a representation of a map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

The present disclosure is directed to forecasting techniques to help improve the planning performance of an autonomous platform 110, such as an autonomous vehicle controlled at least in part using autonomy system(s) 200 (e.g., the autonomous vehicles 310 or 350).

Figure 4:
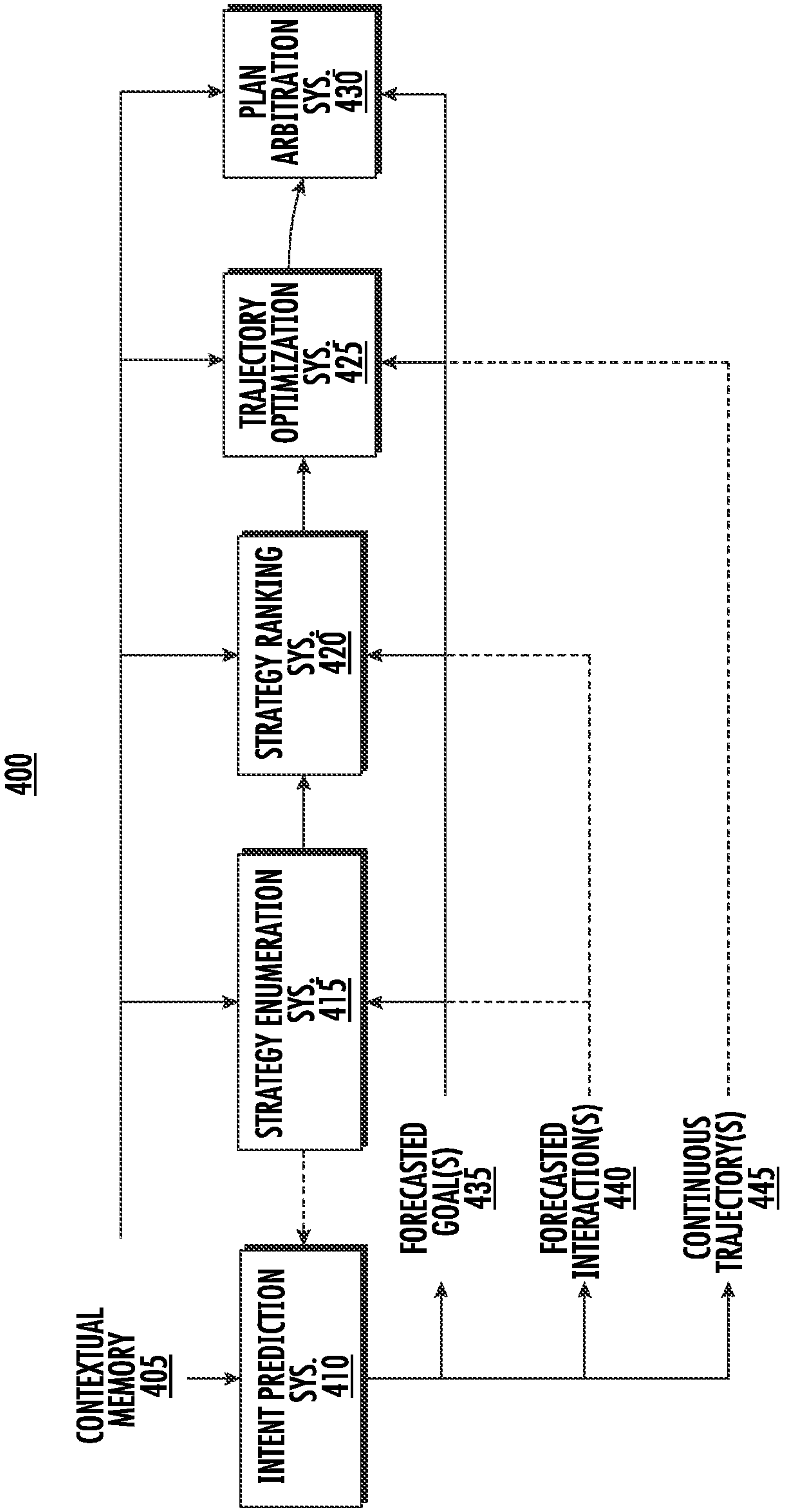
FIG. 4 is a block diagram of a system for initiating the motion of an autonomous platform, according to some implementations of the present disclosure.

FIG. 4 is a block diagram of a system 400 configured to initiate motion of an autonomous platform, according to some implementations of the present disclosure. One or more portions of the system 400 can be included in and/or otherwise be associated with a planning system (e.g., the planning system 250 of FIG. 2) of the autonomous platform. The system 400 can include a contextual memory 405. The contextual memory 405 can include a cache memory that stores contextual data that can be processed by a forecasting system 410, strategy enumeration system 415, strategy ranking system 420, trajectory optimization system 425, and a plan arbitration system 430 to determine how the autonomous platform is to interact with and in its environment. The contextual data can include map data (e.g., map data 210 of FIG. 2), sensor data (e.g., sensor data 204 of FIG. 2), and/or state data indicative of one or more current, historical, and/or predicted future states for actors within the environment of the autonomous vehicle.

The forecasting system 410 can include a machine-learned forecasting model that can process the contextual data to generate discrete intent and continuous motion outputs that can be used to perform one or more portions of a motion planning process. The discrete intent and continuous motion outputs can include one or more forecasted goal(s) 435, forecasted interaction(s) 440, and/or continuous trajectory(s) 445 for each respective actor within an environment.

The strategy enumeration system 415 can determine a plurality of feasible strategies for the autonomous platform based on the contextual data from the contextual memory 405. A respective strategy may include a plurality of discrete decisions that the autonomous platform can make within an operational time horizon within its environment. The plurality of discrete decisions, for example, can include interpretable decisions such as to yield to an actor, merge behind an actor, and/or any other interpretable travel way decision. In some implementations, the strategy enumeration system 415 can determine the plurality of feasible strategies for the autonomous platform based on the forecasted goal(s) 435 and/or forecasted interaction(s) 440 predicted for the actors within the environment.

The strategy ranking system 420 can process the feasible strategies and the contextual data to rank one or more of the feasible strategies. The strategy ranking system 420 can rank the feasible strategies according to one or more costs associated with those strategies. In some cases, the strategy ranking system 420 may include one or more machine-learned models trained on expert human driving data. The one or more machined-learned models may be trained to determine a cost corresponding to a difference between a respective strategy and an expert human driver's strategy in the same driving scenario. In some implementations, the strategy ranking system 420 may consider the forecasted goal(s) 435 and/or forecasted interaction(s) 440 predicted for the actors within the environment when ranking the feasible strategies.

The trajectory optimization system 425 can identify an optimal trajectory for each of the identified strategies based on the contextual data and one or more cost functions. The cost functions, for example, can include static cost functions that encode one or more desired driving behaviors such as, for example, avoiding lane boundaries, remaining near the center of a lane, avoiding acceleration and/or jerk, avoiding steering jerk, etc. In addition, or alternatively, the cost functions can include dynamic cost functions that can evaluate dynamic constraints. The dynamic cost functions, for example, can evaluate the forecasted goal(s) 435, the forecasted interaction(s) 440, and/or the continuous trajectories 445 predicted for the actors within the environment.

The plan arbitration system 430 can select an optimal trajectory and strategy pair for implementation by the autonomous platform. To do so, the plan arbitration system 430 can reject one or more trajectories that result in interference with other actors/objects, violate lane boundaries, etc. The plan arbitration system 430 can select the optimal trajectory and strategy pair from the non-rejected trajectories that optimizes (e.g., minimizes) the aggregate cost as evaluated by the static and/or dynamic cost functions described herein. In some implementations, the plan arbitration system 430 can select the optimal trajectory and strategy pair based on the forecasted goal(s) 435 for the actors within the environment.

The autonomous platform can initiate its motion based on the selected optimal trajectory and strategy pair. In this manner, the motion of the autonomous platform can be initiated based on the forecasted goal(s) 435, forecasted interaction(s) 440, and/or continuous trajectory(s) 445 output by the forecasting system 410.

Figure 5:
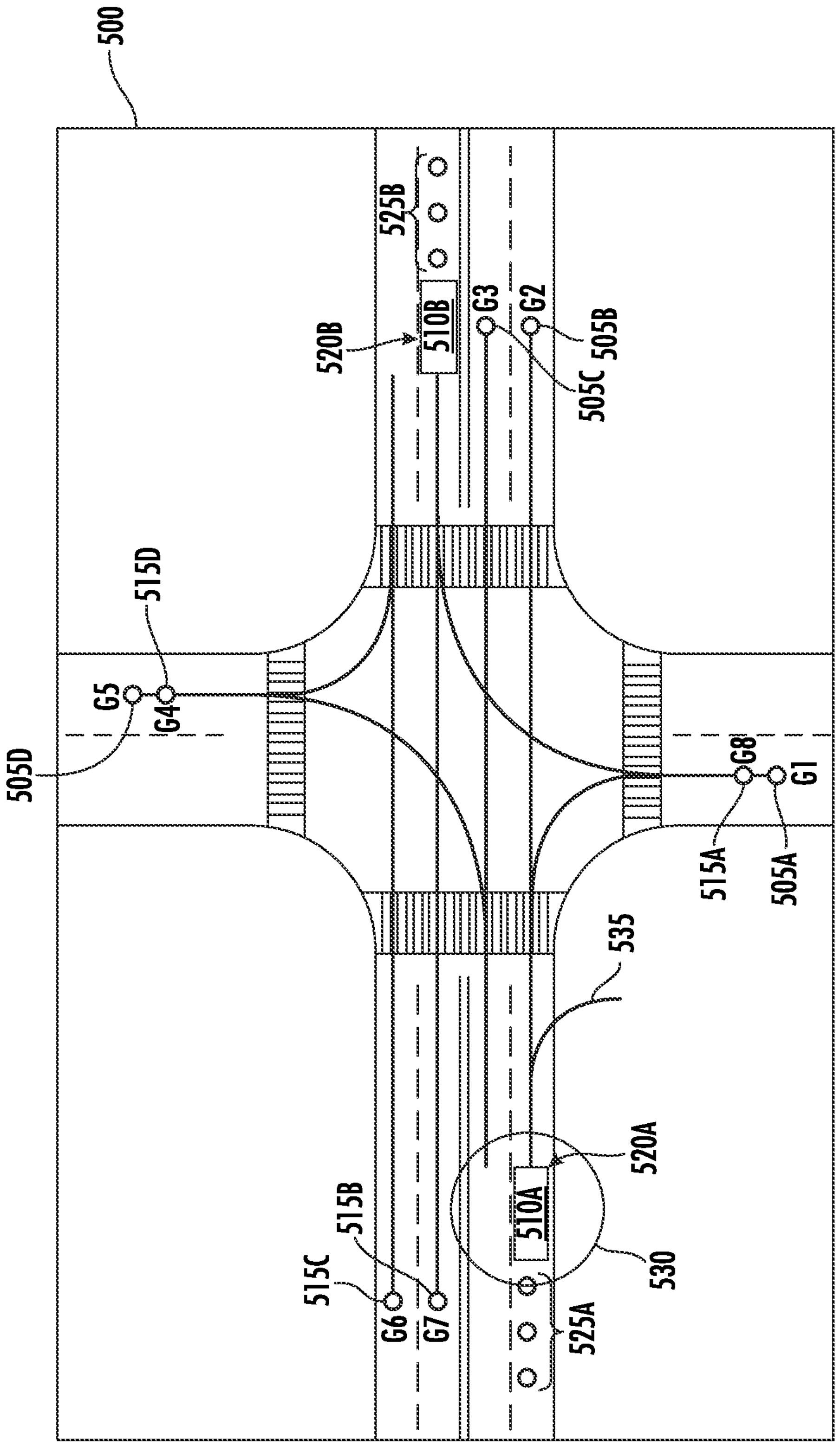
FIG. 5 is an example environment which can be translated for input to a forecasting system according to some implementations of the present disclosure.
Figure 6:
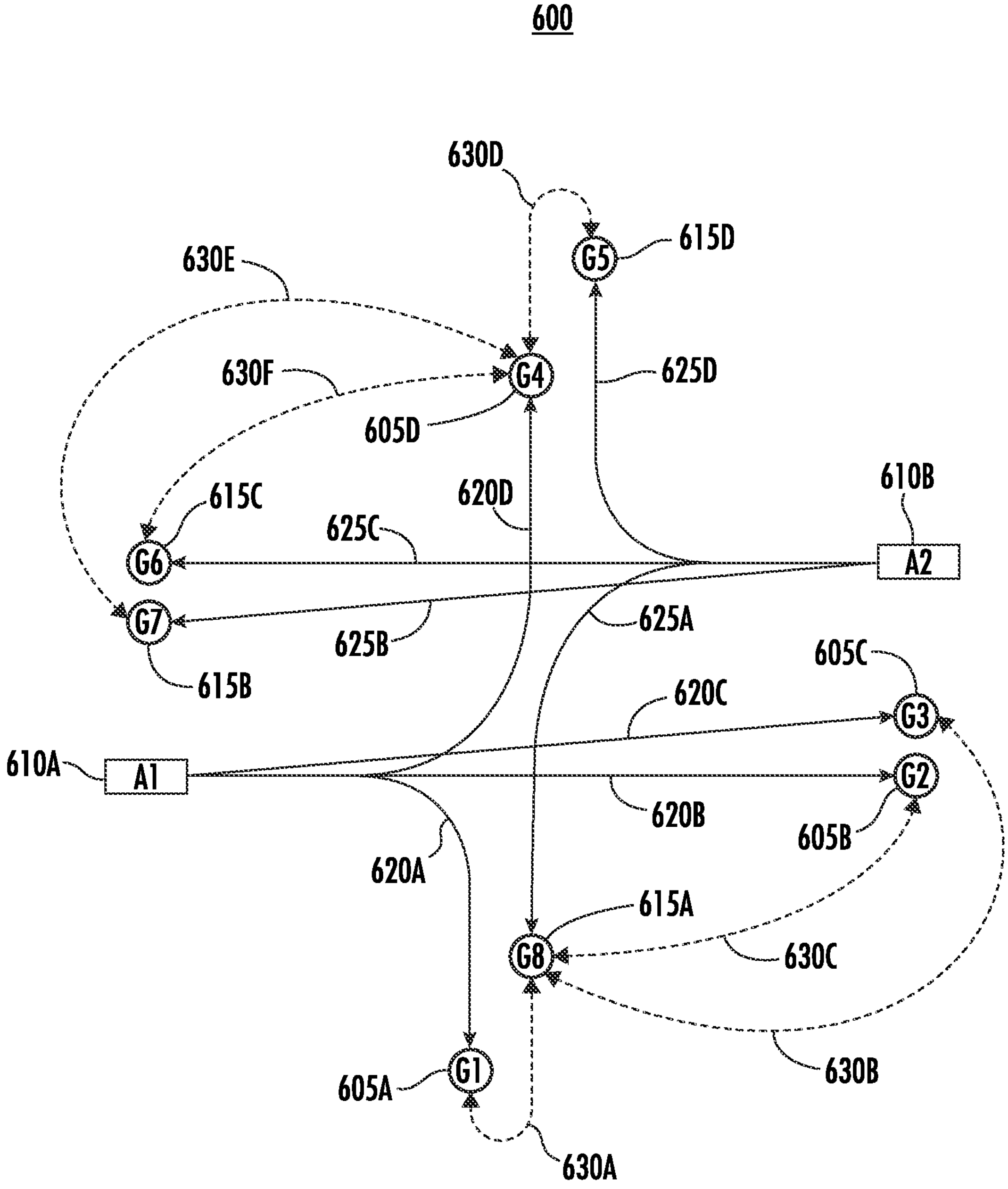
FIG. 6 is a graphical representation of a graph neural network (GNN) generated using a machine-learned forecasting model, according to some implementations of the present disclosure.

FIG. 5 is an example environment 500 that can be modeled by data provided as input to a forecasting system to determine forecasted goals, forecasted interactions, and/or continuous trajectories, according to some implementations of the present disclosure. More particularly, data representing the environment 500 of FIG. 5 can be provided as input to an example forecasting system 700 of FIG. 7, which is trained to encode the data into a graph neural network (GNN) 600 such as depicted in FIG. 6.

The environment 500 can include a plurality of actors 510A-B. An actor may be, for example, a dynamic object such as a vehicle, pedestrian, and/or any other object that changes positions within the environment 500 over time.

Figure 7:
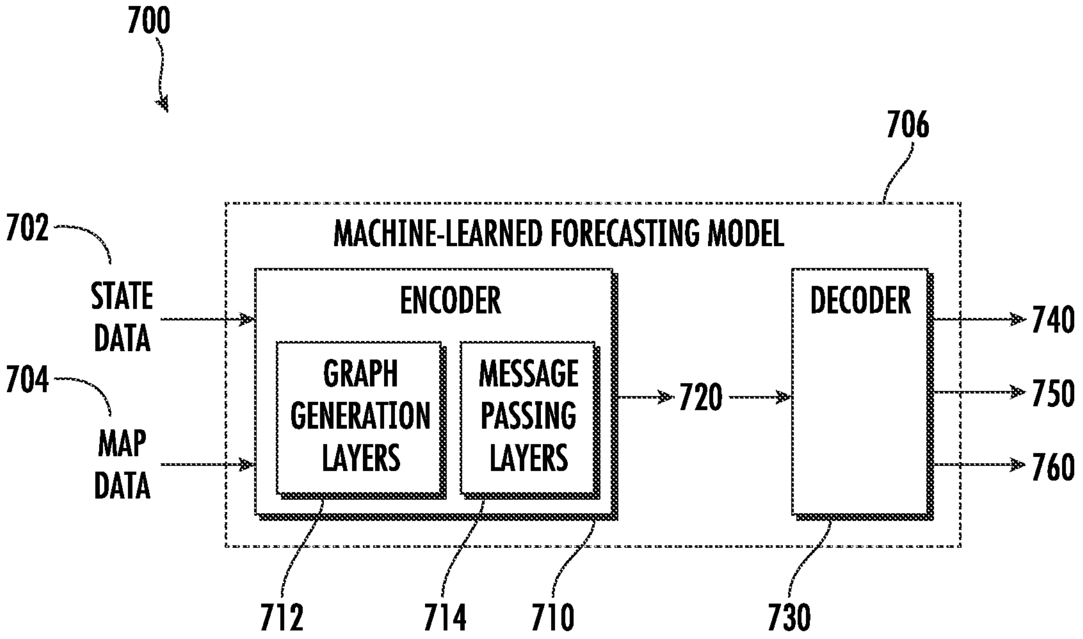
FIG. 7 is a block diagram of an example system architecture of a forecasting system, according to some implementations of the present disclosure.

The forecasting system 700 of FIG. 7 can obtain state data 702 associated with each of a plurality of actors within an environment (e.g., actors 510A-B within the environment 500 of FIG. 5). The state data 702 can include physical characteristics (e.g., a bounding box, shape, etc.) and/or a plurality of actor states associated with a respective actor. The plurality of actor states can be indicative of one or more positions, one or more velocities, and/or one or more headings for the respective actor at a current time and one or more historical times. For instance, the plurality of actor states can include one or more historical states 525A-B and/or current states 520A-B for each of the plurality of actors 510A-B within the environment 500. The current states 520A-B can include a position, velocity, acceleration, heading, etc. at a current time. The historical states 525A-B can include a position, velocity, acceleration, heading, etc. at a historical time before the current time. The historical time can be within one or more historical time ranges. A historical time range can include one or more seconds, minutes, etc. before the current time. In some implementations, the historical states 525A-B can include a plurality of historical positions, velocities, accelerations, headings, etc. for a respective actor within a five second time range before the current time.

In addition, or alternatively, the forecasting system 700 of FIG. 7 can obtain map data 704 associated with an environment (e.g., map data for the environment 500 of FIG. 5). The map data 704 can be indicative of a plurality of lanes of the environment 500 and/or map features for the plurality of lanes. For instance, the map data 704 can include a lane graph descriptive of the plurality of lanes and/or right of way information for the plurality of lanes. In addition, or alternatively, map features within map data 704 can identify lane centerline locations (e.g., nominal waypoints), lane boundary locations, lane boundary types (e.g., physical barrier, solid line, dashed line, etc.), speed limits, and/or any other physical or traffic information for the plurality of lanes of the environment 500.

The map data 704 can define a nominal path for each of the plurality of lanes. The nominal path can be defined by a plurality of waypoints along and/or within a threshold distance of a centerline of a respective lane. For example, the plurality of map features can include a plurality of waypoints for each nominal path defined in the map data 704. For each respective waypoint, the map features can identify a location, speed limit, and/or any other attribute for the corresponding lane at the respective waypoint.

A portion of forecasting system 700 (e.g., one or more graph generation layers 712 of encoder 710) can be configured to determine one or more potential goals for an actor from the state data 702 and map data 704 provided as input to a machine-learned forecasting model 706. A potential goal may be indicative of an actor's intended destination and nominal path to that destination within the environment 500. The potential goal, for example, can represent a position within the environment 500 that an actor can occupy in the future. As one example, the potential goal 505A can represent the position within the environment 500 that a first actor 510A will occupy in the event that the first actor 510A decides to make a right turn. Potential goals may correspond to or be informed by the lanes available to the actor in the actor's immediate vicinity.

Each potential goal can include a goal path and a goal destination. The goal destination can include a future destination location for a respective actor within the environment 500. The future destination location can be based on a predicted discrete decision for the respective actor. For instance, a future destination location can be identified based on a prediction that the respective actor intends to make a right turn, another future destination location can be identified based on a prediction that the respective actor intends to continue straight, etc. The goal path can include one or more waypoints along a path from the current location of the respective actor to the respective future destination location.

The forecasting system 700 can determine the potential goals for each actor within the environment 500 based on contextual data for the environment 500 (e.g., the lanes available to a vehicle). In some implementations, the goal path for a potential goal can include a nominal path defined in the map data 704. For example, the potential goal can represent one of the actor's intended destinations and a nominal path to the intended destination. The map data 704 can include a plurality of map features associated with each potential goal. The map features can identify a plurality of waypoints of a respective nominal path for the potential goal. In this manner, a potential goal can define the spatial aspect of an actor's intended future behavior (e.g., make a right turn, continue straight, etc.) that is grounded on map data 704 corresponding to the environment 500.

The forecasting system 700 can determine a plurality of first potential goals 505A-D for the first actor 510A based on a current state 520A (e.g., position, heading, etc.) of the first actor 510A and the map data. For example, forecasting system 700 can identify each nominal path defined by the map data that includes a waypoint within a search radius 530 of the current state 520A of the first actor 510A.

By way of example, the plurality of first potential goals 505A-D for the first actor 510A can include four potential goals 505A-D based on its location within the environment 500. A first goal 505A can include a nominal path and a destination location in the event that the first actor 510A intends to make a right turn. A second goal 505B can include a nominal path and destination location in the event that the first actor 510A intends to continue straight. A third goal 505C can include a nominal path and destination location in the event that the first actor 510A intends to make a left lane change. A fourth goal 505D can include a nominal path and destination location in the event that the first actor 510A intends to make a left turn.

The forecasting system 700 can determine a plurality of second potential goals 515A-D for a second actor 510B within the environment 500 based on a current state 520B (e.g., position, heading, etc.) of the second actor 510B and the map data. The plurality of second potential goals 515A-D for the second actor 510B can include four different potential goals 515A-D based on the second actor's location within the environment 500. A first goal 515A can include a nominal path and destination location in the event that the second actor 510B intends to make a left turn. A second goal 515B can include a nominal path and destination location in the event that the second actor 510B intends to continue straight. A third goal 515C can include a nominal path and destination location in the event that the second actor 510B intends to make a right lane change. A fourth goal 515D can include a nominal path and destination location in the event that the second actor 510B intends to make a right turn.

In some implementations, the forecasting system 700 can determine a goal-free mode 535 to represent a possibility that a respective actor (e.g., the first actor 510A) does not intend to make a decision in accordance with any of the identified potential goals 505A-D (e.g., by pulling off the road, stopping, etc.).

The forecasting system 700 can be configured to predict the probability that a respective actor will follow each of its goals and/or the goal-free mode. For example, the forecasting system 700 can process the state data 702, the map data 704, and the plurality of potential goals for each actor within the environment 500 with one or more portions of a machine-learned forecasting model 706 to determine a forecasted goal for a respective actor of the plurality of actors 510A-B. By way of example, the machine-learned forecasting model 706 can determine a probability for each potential goal for the respective actor. The forecasted goal can include a respective potential goal that has a highest probability.

As described in further detail herein, the machine-learned forecasting model 706 can also determine at least one forecasted interaction between the respective actor and a different actor of the plurality of actors 510A-B based on the forecasted goal and at least one continuous trajectory for the respective actor based on the forecasted goal.

FIG. 6 is a graphical representation of a graph neural network (GNN) 600 generated using a machine-learned forecasting model (e.g., machine-learned forecasting model 706 of FIG. 7), according to some implementations of the present disclosure. The graph neural network 600 can include a plurality of nodes and a plurality of edges. The plurality of nodes and the plurality of edges can be based on the plurality actors and the plurality of goals of the environment 500 of FIG. 5. The plurality of goals and the plurality of edges depicted in the GNN 600 of FIG. 6 can be generated within the graph generation layers 712 of machine-learned forecasting model 706 of FIG. 7.

For instance, the plurality of nodes in GNN 600 can include a plurality of actor nodes 610A-B respectively corresponding to each actor of the plurality of actors 510A-B within the environment 500. The plurality of actor nodes 610A-B may include at least one actor node for each actor within the environment 500. By way of example, the plurality of actor nodes 610A-B can include a first actor node 610A corresponding to the first actor 510A of the environment 500 and/or a second actor node 610B corresponding to the second actor 510B of the environment 500.

The plurality of nodes in GNN 600 may additionally include a plurality of goal nodes respectively corresponding to each potential goal of a plurality of potential goals identified for actors 510A-B. The plurality of goal nodes can include at least one goal node for each goal identified for each actor within the environment 500. By way of example, the plurality of goal nodes can include a plurality of first goal nodes 605A-D corresponding to the first actor node 610A (e.g., for the first actor 510A) and a plurality of second goal nodes 615A-D corresponding the second actor node 610B (e.g., for the second actor 510B).

The plurality of edges in GNN 600 can include one or more actor-goal edges respectively connecting a respective actor node and a respective goal node. The actor-goal edge(s) can include at least one actor-goal edge between a respective actor and each goal identified for the respective actor within the environment. By way of example, the plurality of actor-goal edges can include a plurality of first actor-goal edges 620A-D corresponding to the first actor node 610A and the plurality of first goal nodes 605A-D (e.g., for the plurality of potential goals 505A-D identified for the first actor 510A). In addition, or alternatively, the plurality of actor-goal edges can include a plurality of second actor-goal nodes 625A-D corresponding to the second actor node 610B and the plurality of second goal nodes 615A-D (e.g., for the plurality of potential goals 515A-D identified for the second actor 510B).

The plurality of edges may additionally include one or more goal-goal edges 630A-F respectively connecting at least two goal nodes of the plurality of goal nodes. A goal-goal edge can be indicative of a relationship between two goal nodes respectively associated with at least two actors within an environment. By way of example, the goal-goal edges 630A-F can include: (1) a first goal-goal edge 630A indicative of a relationship between the first goal node 605A associated with the first actor 510A and the first goal node 615A associated with the second actor 510B; (2) a second goal-goal edge 630B indicative of a relationship between the first goal node 615A associated with the second actor 510B and the third goal node 605C associated with the first actor 510A; (3) a third goal-goal edge 630C indicative of a relationship between the first goal node 615A associated with the second actor 510B and the second goal node 605B associated with the first actor 510A; (4) a fourth goal-goal edge 630D indicative of a relationship between the fourth goal node 615D associated with the second actor 510B and the fourth goal node 605D associated with the first actor 510A; (5) a fifth goal-goal edge 630E indicative of a relationship between the fourth goal node 605D associated with the first actor 510A and the second goal node 615B associated with the second actor 510B; and (6) a sixth goal-goal edge 630F indicative of a relationship between the fourth goal node 605D associated with the first actor 510A and the third goal node 615C associated with the second actor 510B.

The relationship between the at least two goal nodes connected by a respective goal-goal edge can be based on a potential interaction between two actors in the event that the two actors travel in accordance with the at least two goals represented by the connected goal nodes.

The nodes and edges of the graph neural network 600 can include a plurality of feature embeddings. The plurality of feature embeddings can encode different features based on a corresponding node and/or edge of the graph neural network 600. For instance, the plurality of feature embeddings can include a plurality of actor feature embeddings corresponding to the plurality of actor nodes 610A-B, a plurality of goal feature embeddings corresponding to the plurality of goal nodes, a plurality of actor-goal feature embeddings corresponding to the plurality of actor-goal edges, and one or more goal-goal feature embeddings corresponding to the one or more goal-goal edges 630A-F.

With reference again to FIG. 7, the forecasting system 700 can process the state data 702 and the map data 704 using an encoder portion 710 of machine-learned forecasting model 706. The encoder portion 710 can include a plurality of encoding layers. The plurality of encoding layers can be shared across multiple encoding tasks and can include a plurality of graph generation layers 712 and a plurality of message passing layers 714. The plurality of graph generation layers 712 are intended to determine the nodes and edges within a GNN (e.g., GNN 600 of FIG. 6) in accordance with the plurality of potential goals determined for actors within an environment and to create a latent representation for each node and edge. The latent representations can be in the form of multiple embeddings, including goal feature embeddings, actor feature embeddings, goal-goal feature embeddings, and actor-goal feature embeddings. Although FIG. 7 depicts encoding for all such feature embeddings to occur within a single encoder portion 710, it should be appreciated that distinct encoder networks or models could be provided for generating and updating the different types of embeddings (e.g., a goal feature model, an actor feature model, a goal-goal feature model, and an actor-goal feature model).

Once the latent representations for nodes and edges are encoded by graph generation layers 712 of encoder portion 710, one or more message passing layers 714 (e.g., similar to convolutional layers of a CNN) are employed to learn updated graph embeddings and generate a compact feature representation 720.

More particularly, the one or more message passing layers 714 of the machine-learned forecasting model can perform one or more rounds of message passing to share information between the plurality of nodes and the plurality of edges of the graph neural network to perform scene-level reasoning. For example, the machine-learned forecasting model 706 can perform the one or more message passing rounds via successive message passing 714 to generate a plurality of updated feature embeddings based on information from adjacent feature embeddings. During each round of message passing, each feature embedding can be updated based on the information encoded within each adjacent feature embedding. In other words, message passing between nodes/edges of the GNN as implemented within message passing layers 714 can help to capture dependencies within the graph by having nodes in the graph aggregate a message from its neighboring nodes. For example, for a given goal node represented by one or more feature embeddings, each message passing layer would serve to update the feature embeddings for the given goal node to include data associated with the previous representation of that node plus data associated with that node's nearest neighbors in the graph (e.g., GNN 600). Each iteration of updating the feature embeddings can correspond to one layer of the plurality of message passing layers 714. For each iteration, feature embedding data is shared one hop or step along the graph. As such, the plurality of message passing layers 714 can be configured to include a number of layers at least as great as the longest path distance within the graph, wherein path distance is defined as a number of discrete steps among nodes within the graph.

In some implementations, the number of rounds of message passing corresponding to a number of layers within the plurality of message passing layers 714 can be static and/or dynamically determined based on one or more characteristics of an environment. For instance, the number of rounds of message passing can be based on a number of actors within an environment, a number of potential goals for each of the actors within the environment, a number of potential interactions between the actors within the environment, etc. In some implementations, the number of rounds of message passing can be determined based on the number of nodes, edges, and/or feature embeddings of the graph neural network. For instance, the number of rounds of message passing can be determined such that a respective feature embedding can be updated based on information from a feature embedding corresponding to the furthest node and/or edge in the graph neural network.

The machine-learned forecasting model can include various components for performing the message passing. The machine-learned forecasting model can utilize a goal-goal edge model that is configured to update a goal-goal feature embedding based on a combination of features of adjacent goal nodes. For example, the goal-goal edge model can be trained to update the goal-goal feature embedding 830 based features passed between the goal nodes 805A and 805C.

The machine-learned forecasting model can utilize an actor-goal edge model for message passing. The actor-goal edge model can be configured to update actor-goal feature embeddings based on a combination of features of adjacent actor nodes and goal nodes. For example, the actor-goal model can be trained to update the actor-goal feature embedding 825 based on features passed between embeddings of actor node 810A and goal node 805A based on the features passed between the nodes.

The machine-learned forecasting model can utilize a goal node model for message passing. The goal node model can be configured to update an embedding associated with a goal node based on features from one or more other goal nodes. For example, the goal node model can update a feature embedding associated with a goal node based on an aggregation of embedding updates of other goal-goal feature embeddings and actor-goal feature embeddings.

The machine-learned forecasting model can utilize an actor node model for message passing. The actor node model can be configured to update an embedding associated with an actor node based on features from one or more other actor nodes. For example, the actor node model can update the actor feature embedding 850 associated with actor node 810A based on features passed from other actor nodes.

The message passing layer(s) can be trained with and on the same data as the three decoder heads (e.g., for the goal probability head, the labeled ground truth goal paths as determined by mean cross-track distances). In some implementations, the entire machine-learned forecasting model can be trained in an end-to-end fashion. The training can be performed using the systems and hardware described herein.

Referring still to FIG. 7, feature representation 720 may correspond to or include any suitable representation for computationally describing a plurality of updated feature embeddings, such as but not limited to a feature vector. Feature representation 720 may include or otherwise describe a plurality of learned feature embeddings including goal feature embeddings, actor feature embeddings, goal-goal feature embeddings, and actor-goal feature embeddings as described herein.

Feature representation 720 can be decoded using the decoder 730 to provide an output of the machine-learned forecasting model 706. The decoder 730 can be a learned model that is trained using processes similar to those described with respect to FIGS. 16 and 17. The decoder 730 can allow the machine-learned forecasting model 706 to determine various types of outputs. Feature representation 720 can then be provided as input to a decoder portion 730 of machine-learned forecasting model 706. Decoder portion 730 can include a plurality of decoding layers. Decoder portion 730 can be trained to make predictions from the node and edge embeddings provided within feature representation 720. More particularly, decoder model 730 can be configured to generate predictions corresponding to: (i) one or more goal probabilities 740; (ii) one or more interaction probabilities 750; and/or (iii) one or more continuous trajectories 760.

Encoder portion 710 of the machine-learned forecasting model 706 is configured to generate a plurality of feature embeddings 720 corresponding to the plurality of actors and the plurality of potential goals. The encoder portion 710 of the machine-learned forecasting model 706, for example, can encode a plurality of state and/or map features from state data 702 and map data 704 for a respective feature embedding within the plurality of feature embeddings 720. The encoder portion 710 can include differentiable non-linear transformations configured to transform raw inputs (e.g., state/map data) to latent feature embeddings. In some implementations, the encoder portion 710 can include multiple two-layer multilayer perceptrons as part of the framework within graph generation layers 712.

The encoder portion 710 can process the state data 702 to generate an actor feature embedding for a respective actor node. The actor feature embedding can be based on a plurality of actor states (e.g., current, historical, etc.) associated with a respective actor of the plurality of actors 510A-B. An actor feature embedding, for example, can encode information associated with the respective actor's current and/or historical position, heading, footprint, etc. in an actor coordinate frame.

Each actor node can include a respective actor feature embedding. For instance, the first actor node 610A can include an actor feature embedding encoding the first actor's current and/or historical position, heading, footprint, etc. In addition, or alternatively, the second actor node 610B can include an actor feature embedding encoding the second actor's current and/or historical position, heading, footprint, etc.

The encoder portion 710 can process the map data 704 to generate a goal feature embedding for a respective goal node. A goal feature embedding can be generated by processing a plurality of map features associated with a destination location of a respective goal. A goal feature embedding, for example, can encode information associated with the respective goal's destination location within the environment.

Each goal node can include a respective goal feature embedding. For instance, the first goal node 605A for the first actor 510A can include a goal feature embedding associated with the location of the goal destination for the first goal 505A; the second goal node 605B for the first actor 510A can include a goal feature embedding associated with the location of the goal destination for the second goal 505B; the first goal node 615A for the second actor 510B can include a goal feature embedding associated with the location of the goal destination for the first goal 515A; the second goal node 615B for the second actor 510B can include a goal feature embedding associated with the location of the goal destination for the second goal 515B, etc.

The encoder portion 710 can process the state data 702 and the map data 704 to generate an actor-goal feature embedding for a respective actor-goal edge. The actor-goal feature embedding can encode information associated with a plurality of actor states relative to a respective goal. The plurality of actor states relative to the first goal, for example, can be the plurality of actor states in a path tangent frame.

Each actor-goal edge can include a respective actor-goal feature embedding. For instance, the first actor-goal edge 620A can include a respective actor-goal feature embedding that encodes current and/or historical actor state information associated with the first actor 510A corresponding to the first actor node 610A relative to the first goal 505A corresponding to the first goal node 605A, the first actor-goal edge 625A can include a respective actor-goal feature embedding that encodes current and/or historical actor state information associated with the second actor 510B corresponding to the second actor node 610B relative to the first goal 515A corresponding to the first goal node 615A, etc.

The encoder portion 710 can process the state data 702 and the map data 704 to generate a goal-goal feature embedding for a respective goal-goal edge. The respective goal-goal feature embedding can encode information associated with a plurality of actor states for a respective actor (e.g., the first actor 510A) relative to another actor (e.g., the second actor 510B) of the plurality of actors 510A-B. The respective goal-goal feature embedding, for example, can encode state information for the respective actor in the other actor's frame.

In addition, the goal-goal feature embedding can further encode one or more distances between the actor(s) and a shared space associated with the at least two goals connected by the respective goal-goal edge. The distance(s), for example, can include a first distance between respective actor and the shared space and a second distance between the other actor and the shared space.

Each goal-goal edge can include a respective goal-goal feature embedding. By way of example, the first goal-goal edge 630A between the first goal node 605A associated with the first actor node 610A and the first goal node 615A associated with the second actor node 610B can include a goal-goal feature embedding that encodes state information for the first actor 510A corresponding to the first actor node 610A relative to the second actor 510B corresponding to the second actor node 610B. In addition, the first goal-goal feature embedding can encode the distance between the first actor 510A and the shared space 710 and the distance between the second actor 510B and the shared space 710.

As previously described, the machine-learned forecasting model 706 can process the plurality of feature embeddings provided in feature representation 720 using decoder portion 730 to determine the forecasted goal(s) 740, the forecasted interaction(s) 750, and/or the continuous trajectory(s) 760 for each actor in the environment.

In some implementations, the technology of the present disclosure can evaluate a scene, and make predictions associated thereof, by representing the autonomous vehicle that includes (or is running) the graph neural network using its onboard computing system as a node of the graph neural network. In this way, the computing system of the autonomous vehicle can evaluate the autonomous vehicle as an actor within the scene.

To help do so, the computing system can obtain state data associated with the autonomous vehicle and map data indicating a plurality of lanes of the environment. The state data associated with the autonomous vehicle can be generated using one or more of the vehicle's onboard systems. For instance, the state data can be associated with a localization system (e.g., the localization system 230 of FIG. 2) or an inertial measure unit (IMU) of the autonomous vehicle. For example, position information encoded in the state coded can be generated by the localization system. Additionally, or alternatively, velocity, acceleration, heading, etc. information that is encoded in the state data can be generated by an IMU.

In a manner as similarly described herein, the computing system can determine at least one potential goal of the autonomous vehicle based on the state data and the map data. The potential goal can include a potential destination location in the environment and a goal path to the potential destination location for the autonomous vehicle.

The computing system can process the state data, the map data, and the at least one potential goal with the machine-learned forecasting model to determine (i) a forecasted goal for the autonomous vehicle, (ii) a forecasted interaction between the autonomous vehicle and a different actor based on the forecasted goal, and (iii) a continuous trajectory for the autonomous vehicle based on the forecasted goal. This can include, for example, representing the autonomous vehicle as a node within a graph neural network. In this way, the autonomous vehicle can leverage the technology described herein to help predict, and plan its motion for, potential interactions between the autonomous vehicle and other actors within the vehicle's environment.

Figure 8:
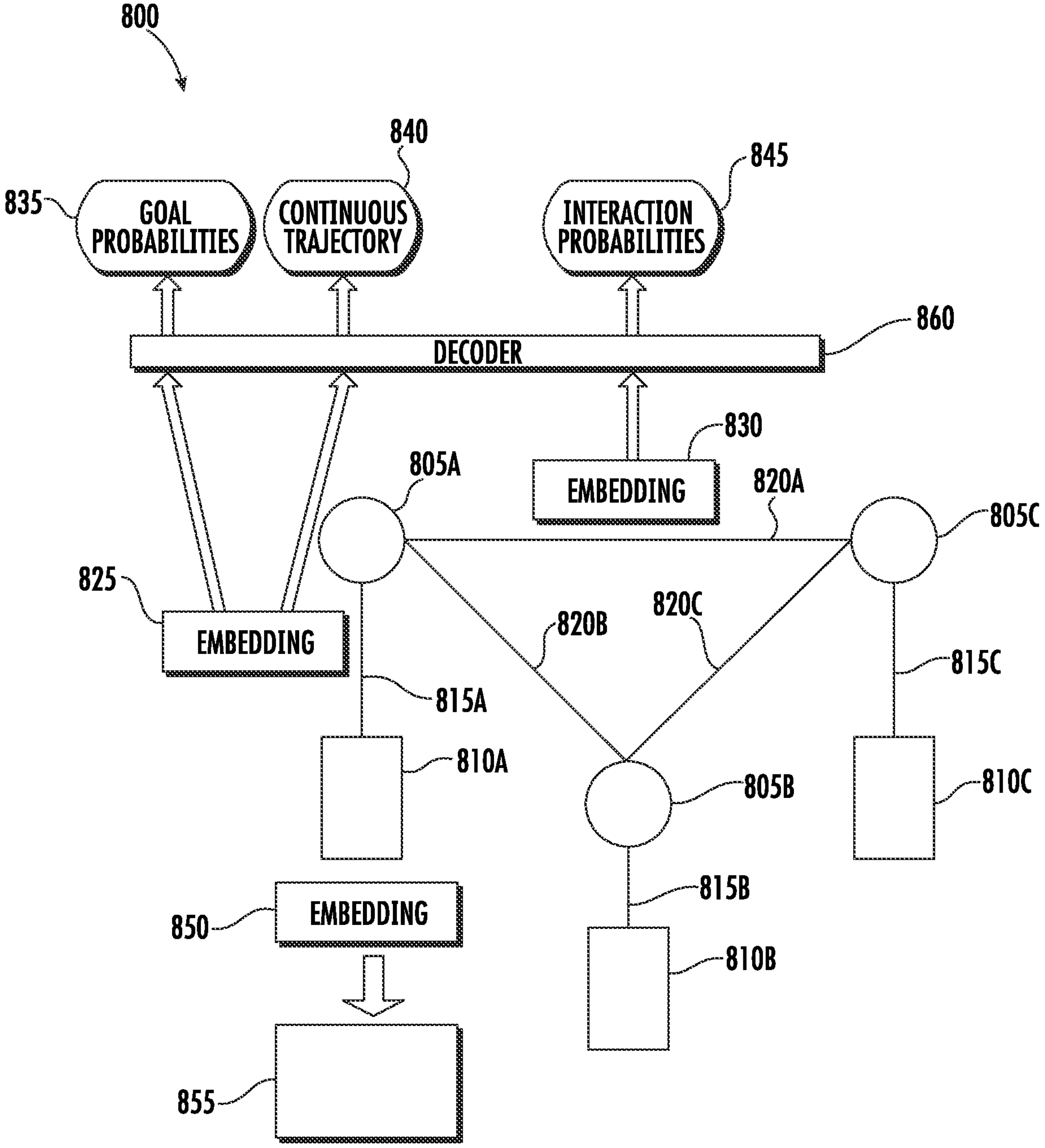
FIG. 8 is an example diagram of data flow within a machine-learned forecasting model, according to some implementations of the present disclosure.

FIG. 8 is an example diagram of data flow within a system 800, according to some implementations of the present disclosure. The system 800 can correspond to forecasting system 700 of FIG. 7, which can be employed to generate a graph neural network including a plurality of actor nodes 810A-C, a plurality of goal nodes 805A-C, a plurality of actor-goal edges 815A-C, and a plurality of goal-goal edges 820A-C. Each of the plurality of nodes and edges can be associated with a respective feature embedding. As examples, the actor-goal edge 815A can include an actor-goal feature embedding 825, the goal-goal edge 820A can include a goal-goal feature embedding 830, and the actor node 810A can include an actor feature embedding 850. These feature embeddings 825, 830, and 850 can be included as part of a feature representation that is passed to decoder 860. Decoder 860 can have been trained to receive a feature representation and generate a plurality of predictions corresponding to goal probabilities 835, continuous trajectories 840, and interaction probabilities 845. Decoder 860 can correspond to a decoder 730 such as described with reference to FIG. 7.

A machine-learned forecasting model 706 can determine, for instance, the goal probabilities 835, the interaction probabilities 845, and/or the continuous trajectory 840 for a respective actor within an environment based on the plurality of updated feature embeddings.

The machine-learned forecasting model 706 can predict goal probabilities 835 for each actor. Goal probabilities 835 may indicate the likelihood that a particular actor will follow each potential goal path available to the actor or none of the goal paths. Goal probabilities 835 may take the form of a probability distribution over the potential goal paths, including no goal path. To determine the goal probabilities 835, the machine-learned forecasting model can process the actor feature embedding and the actor-goal feature embedding. For example, the machine-learned forecasting model 706 can process at least one of the actor feature embedding 850 or the actor-goal feature embedding 825 to determine the goal probability 835 for the respective actor corresponding to the actor node 810A. In doing so, the machine-learned forecasting model 706 can determine at least one of a goal-based score or a goal-free score 855 for the respective actor. The goal-based score can allow the machine-learned forecasting model 706 to determine a probability that the respective actor will move in accordance with a respective potential goal and output a probabilistic value indicative associated with such movement. The goal-free score 855 can include a probabilistic goal-value indicative of a probability that a respective actor does not move in accordance with any identified potential goal. Using the goal-based score and/or goal-free score 855, the machine-learned forecasting model can determine a goal probability 835 for a respective actor associated with the actor node 810A. The goal probability 835 can, for example, be based on the probabilities associated with each potential goal identified for the respective actor and/or the probability that the actor does not move in accordance with any of the identified potential goals. The goal probability 835, for example, can include a respective potential goal that has a highest probability.

The machine-learned forecasting model 706 can determine interaction probabilities 845 for each pair of overlapping goal paths for different actors. Interaction probabilities 845 may indicate the likelihood that one actor will yield to, reverse yield to, or ignore another actor, given that the actors follow the overlapping goal paths. The interaction probabilities 845 for a particular pair of overlapping goal paths may be represented as a probability distribution over such interaction types. For example, the machine-learned forecasting model 706 can process the goal-goal feature embedding 830 to determine the interaction probabilities 845 interaction probabilities 845 for the overlapping goal paths between the actor corresponding to the actor node 810A and a different actor corresponding to the actor node 810C based on the forecasted goal(s) corresponding to goal node(s) 805A and 805C.

The machine-learned forecasting model 706 can determine a continuous trajectory 840 for each respective actor based on the plurality of feature embeddings and a forecasted goal for each respective actor. As an example, the machine-learned forecasting model 706 can determine the continuous trajectory 840 for the respective actor associated with the actor node 810A based on the forecasted goal 835 and the actor-goal feature embedding 825. A continuous trajectory 840 can include a forecasted future trajectory for a respective actor that is conditioned on a particular goal.

Figure 9:
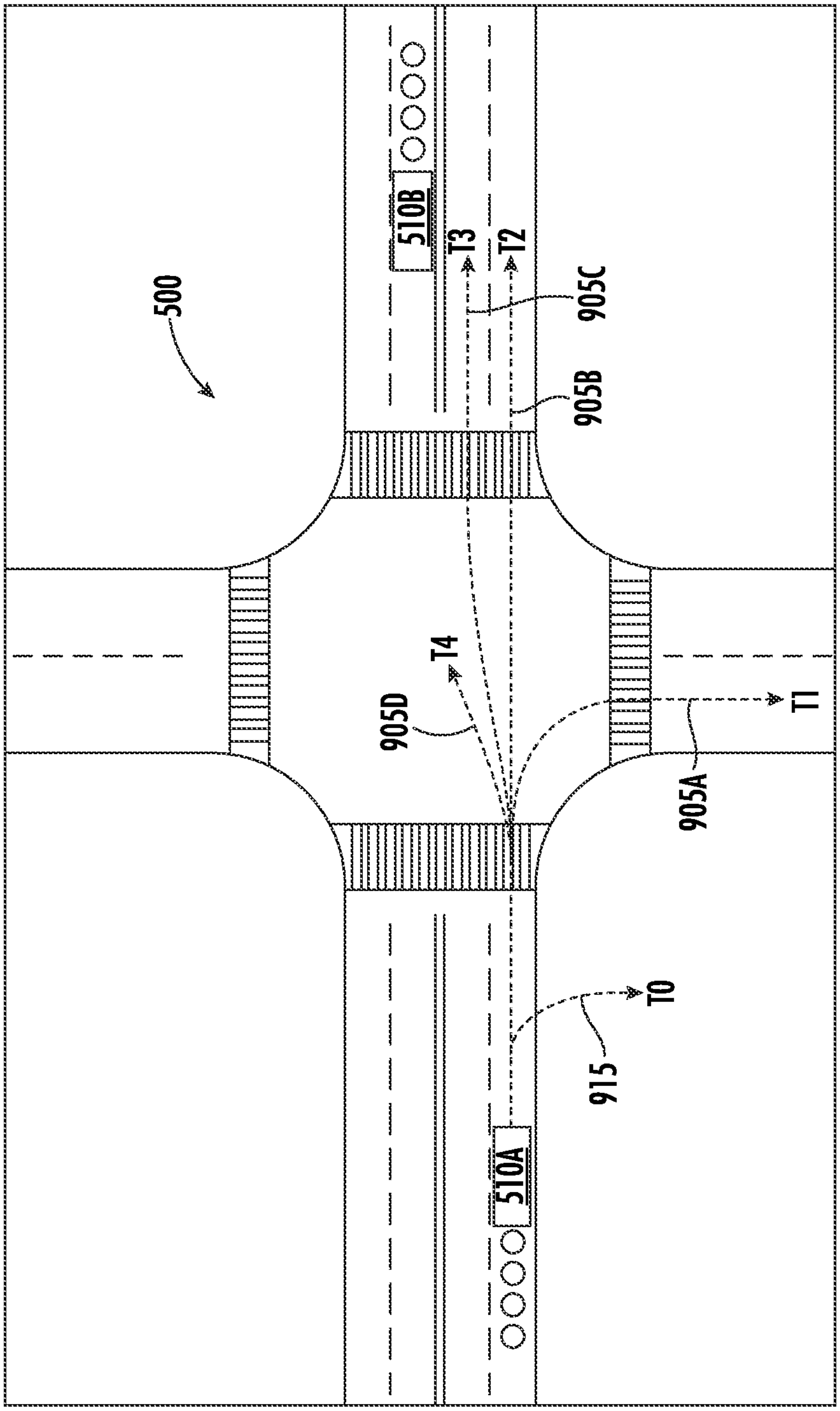
FIG. 9 is an example environment translated for input to a forecasting system, according to some implementations of the present disclosure.

By way of example, FIG. 9 is an example diagram 900 including continuous trajectories that can be translated for input to a machine-learned forecasting system, according to some implementations of the present disclosure. The example diagram 900 includes the environment 500 with first actor 510A and the second actor 510B. The example diagram 900 includes four continuous trajectories 905A-D conditioned on each potential goal identified for the first actor 510A. Each continuous trajectory 905A-D can include a plurality of waypoints indicative of a potential future location of the first actor 510A in the event the first actor 510A decides to move in accordance with an identified goal.

The waypoints of each continuous trajectory 905A-D can be conditioned on a respective goal 505A-D of FIG. 5. For instance, the continuous trajectory 905A can include a plurality of waypoints conditioned on the goal path of the potential goal 505A. The continuous trajectory 905B can include a plurality of waypoints conditioned on the goal path of the potential goal 505B. The continuous trajectory 905C can include a plurality of waypoints conditioned on the goal path of the potential goal 505C. The trajectory 905D can include a plurality of waypoints conditioned on the goal path of the potential goal 505D.

In addition, a continuous trajectory can include a goal-free trajectory 915. The goal-free trajectory can be representative of the probability that the first actor 510A does not travel in accordance with any of the potential trajectories 905A-D. The goal-free trajectory 915 can include a null value. In addition, or alternatively, the continuous trajectory can include one or more waypoints conditioned on an abnormal behavior (e.g., pulling over, etc.) that may cause the first actor 510A to not follow an identified potential goal.

Turning back to FIG. 8, the continuous trajectory 840 can be conditioned on the goal probabilities 835 and refined based on the information encoded by the actor-goal feature embedding 825. By way of example, the continuous trajectory 840 can include a plurality of waypoints conditioned on the goal path associated with the goal probabilities 835. The location and/or timing of the waypoints can be offset from the goal path based on the state data and/or map data encoded by the actor-goal embedding 825. In some implementations, the continuous trajectory 840 can be generated based on the updated data encoded by the updated actor-goal embedding. In this manner, the continuous trajectory 840 can be generated based on information aggregated across each of the plurality of feature embeddings corresponding to the plurality of nodes and edges of the graph neural network.

The machine-learned forecasting model can output goal probabilities 835 and a continuous trajectory 840 conditioned on the goal probabilities 835 for each actor in an environment. The actor can include an autonomous platform operating within the environment. In some implementations, the machine-learned forecasting model can condition the goal probabilities 835 and/or the continuous trajectory 840 based on a known action of the autonomous platform.

Figure 10:
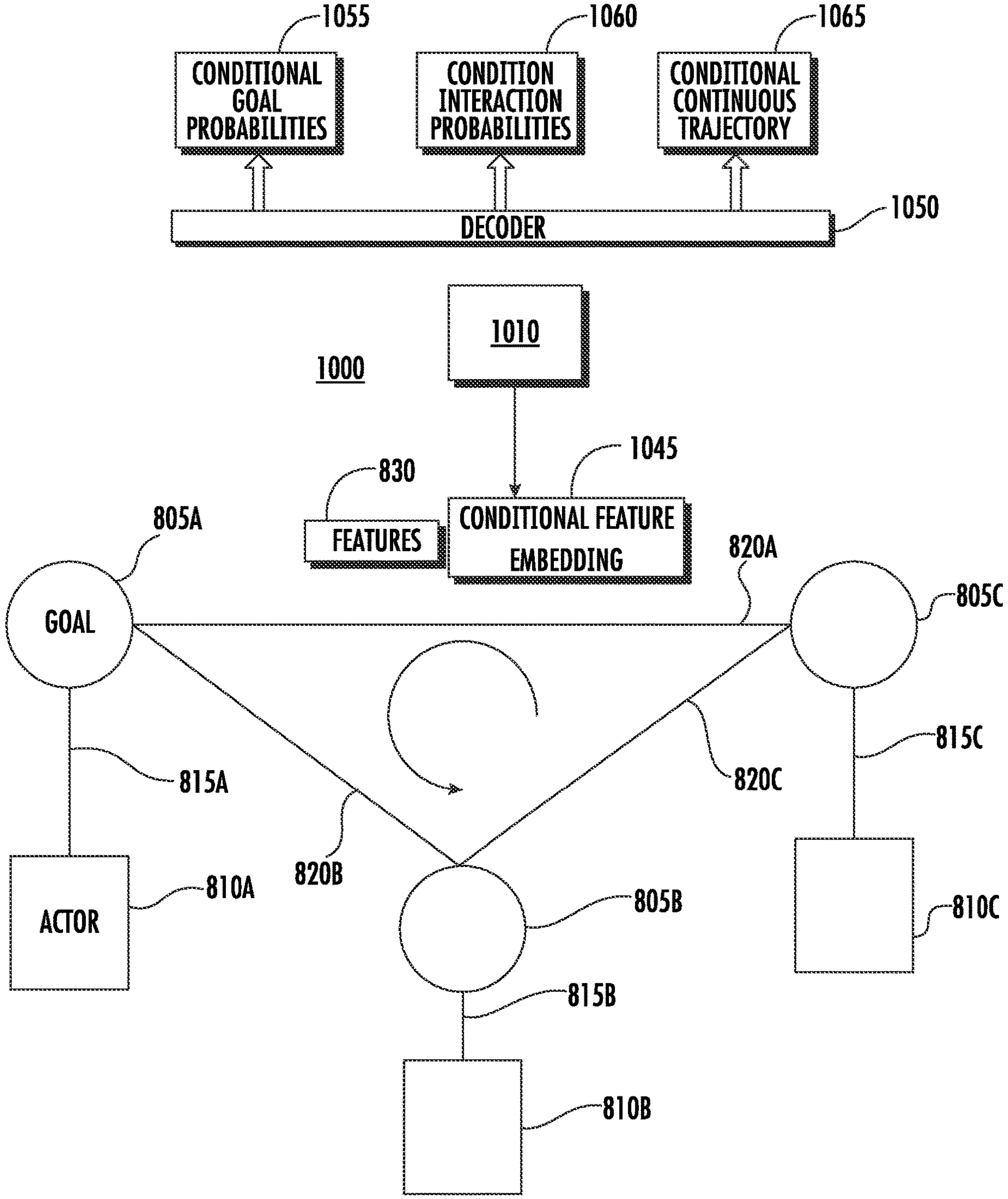
FIG. 10 is an example diagram of data flow associated with continuous trajectories within a machine-learned forecasting model, according to some implementations of the present disclosure.

FIG. 10 is a diagram 1000 of data flow within a system for predicting an actor's intent conditioned on at least one known decision, according to some implementations of the present disclosure. The example diagram 1000 includes a graph neural network generated in accordance with the disclosed techniques. The graph neural network can include the plurality of actor nodes 810A-C, the plurality of goal nodes 805A-C, the plurality of actor-goal edges 815A-C, and/or the plurality of goal-goal edges 820A-C of the graph neural network of FIG. 8.

The machine-learned forecasting model 706 can receive vehicle motion data 1010 for the autonomous platform. The vehicle motion data 1010 can be indicative of a potential motion of the autonomous platform. For instance, the vehicle motion data 1010 can identify a discrete motion strategy for the autonomous platform. The discrete motion strategy can be indicative of an interpretable travel decision such as, for example, a decision to continue straight, make a turn, change a lane, merge into traffic, pull over, etc. In some implementations, the discrete motion strategy can correspond to a particular potential goal for at least one actor (e.g., the autonomous platform) within an environment.

The machine-learned forecasting model 706 can generate a conditioned goal probability 1055, a conditioned interaction probability 1060, and/or a conditioned continuous trajectory 1065 for a respective actor that is conditioned on the vehicle motion data 1010 by incorporating information associated with the vehicle motion data 1010 to the latent space of the graph neural network.

For example, the machine-learned forecasting model 706 can predict a marginal goal probability, a marginal interaction probability, and a marginal continuous trajectory after performing at least one round of message passing between the plurality of actor nodes 810A-C, the plurality of goal nodes 805A-C, the plurality of actor-goal edges 815A-C, and/or the plurality of goal-goal edges 820A-C to generate a plurality of updated feature embeddings for the plurality of nodes and/or edges of the graph neural network.

The machine-learned forecasting model 706 can generate a conditional feature embedding 1045 based on the potential motion of the autonomous vehicle. For instance, the machine-learned forecasting model 706 can transform the vehicle motion data 1010 into the conditional feature embedding 1045. The conditional feature embedding 1045, for example, can encode state data, map data, and/or any other data associated with the vehicle motion data 1010. The machine-learned forecasting model can concatenate the conditional feature embedding 1045 with at least one of the plurality of updated feature embeddings. For instance, the machine-learned forecasting model can concatenate the conditional feature embedding 1045 with a corresponding updated goal-goal feature embedding 830. The machine-learned forecasting model can perform one or more rounds of message passing with the concatenated feature embedding to generate a plurality of conditioned feature embeddings that account for the future motion of the autonomous platform.

The machine-learned forecasting model 706 can process the plurality of conditioned feature embeddings (e.g., using decoder 1050) to determine conditional goal probabilities 1055, conditional interaction probabilities 1060, and/or a conditional continuous trajectory 1065 for a respective actor that is conditioned on the future motion of the autonomous platform. Similar to the decoder previously described herein, the decoder 1050 can be a learned model that is trained using processes similar to those described herein.

In some implementations, the graph neural network can include a typed graph neural network model that includes a separate goal-goal edge encoder for each interaction type (e.g., yield, reverse yield, ignore, unknown, etc.) of a marginal forecasted interaction. For instance, the typed graph neural network model can include a yield goal-goal encoder for processing goal-goal feature embeddings associated with a marginal forecasted interaction of a yield categorical distribution. The typed graph neural network model can include another, reverse yield, goal-goal encoder for processing goal-goal feature embeddings associated with a marginal forecasted interaction of a reverse yield categorical distribution. The typed graph neural network model can include yet another, ignore, goal-goal encoder for processing goal-goal feature embeddings that are not associated with marginal forecasted interaction. In some implementations, the typed graph neural network model can include an "unknown" goal-goal encoder for processing goal-goal feature embeddings associated with a marginal forecasted interaction in which the categorical distribution is unknown or not known within a particular confidence threshold. In this manner, each goal-goal encoder can learn different weights to interpret embeddings corresponding to different interaction types.

The machine-learned forecasting model 706 can be trained according to one or more machine-learning techniques. By way of example, the machine-learned forecasting model 706 can be trained using one or more supervised, unsupervised, reinforcement, etc. learning techniques. In some implementations, for example, the machine-learned forecasting model 706 can be trained using one or more supervised training techniques based on labeled training data. For instance, at least a portion of the labeled training data can be input to the machine-learned forecasting model 706 and the machine-learned forecasting model 706 can be trained through back-propagation of errors based on the labels.

The labeled training data can include data indicative of a plurality of real-world environments over time. The data, for example, can include map data for the plurality of real-world environments. In addition, or alternatively, the data can include sensor data (e.g., image data, LiDAR data, etc.) for the plurality of real-world environments previously recorded by one or more sensors of an autonomous platform. The sensor data, for example, can be descriptive of one or more traffic sequences indicative of a training environment and/or one or more actors within the training environment over a range of time.

The training data can include a plurality of training labels. The plurality of training labels can identify a plurality goals and/or a plurality of interactions within a previously recorded training environment.

Figure 11:
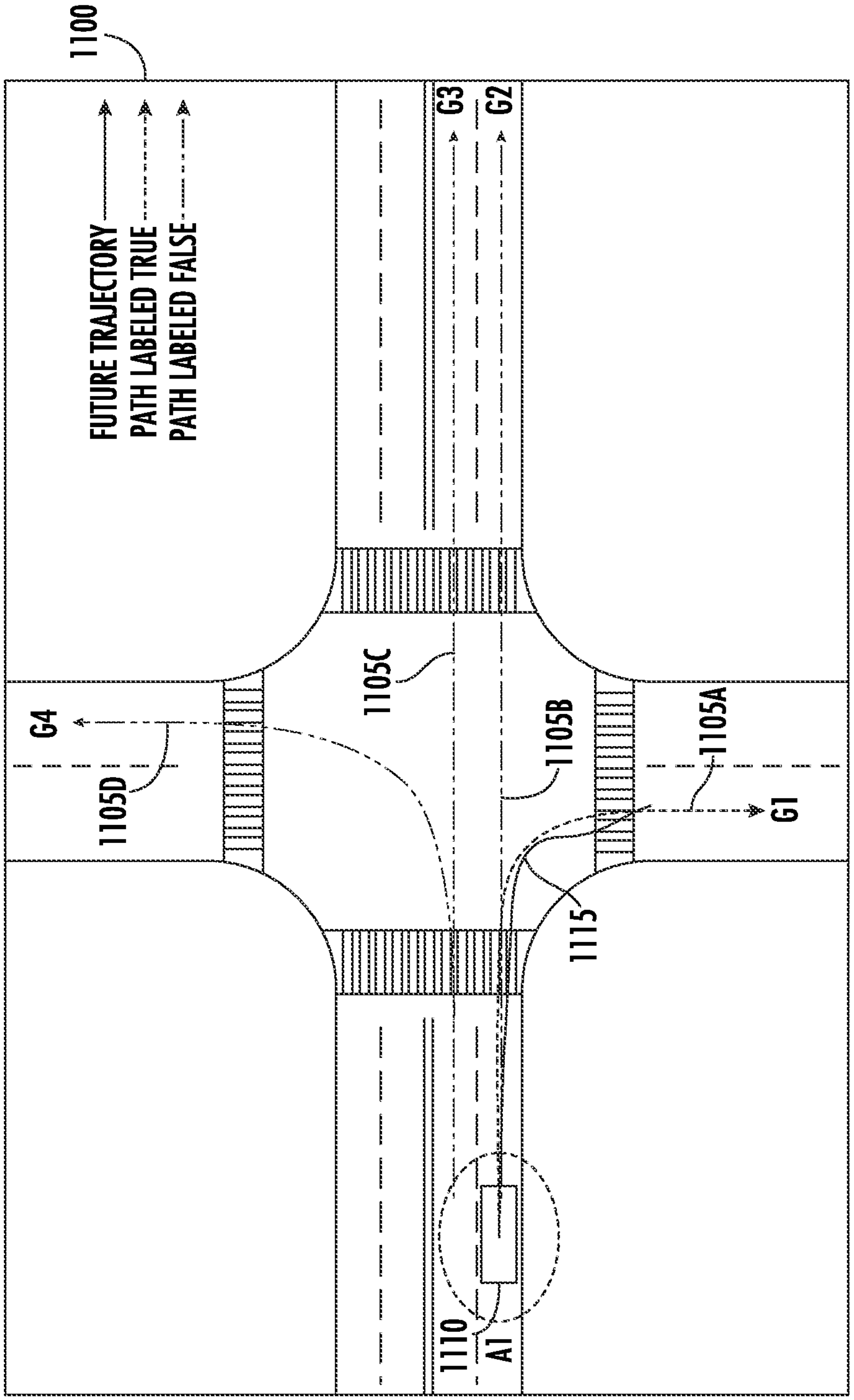
FIG. 11 is an example diagram of generating labelled training data for training a machine-learned forecasting model, according to some implementations of the present disclosure.

FIG. 11 is a diagram of labeling techniques for generating goal labels for a labelling environment 1100, according to some implementations of the present disclosure. Training data can include data associated with labelling environment 1100 over a time range. At a first time, the labelling environment 1100 can include at least one actor 1110 and a plurality of potential goals 1105A-D for the actor 1110. In addition, or alternatively, the training data can be indicative of a recorded trajectory 1115 for the actor 1110 over the time range. The actor 1110 can be a real actor (as shown in recorded log data) or a simulated actor. Thus, resultant training data can be log data of a real actor or a simulation of an actor.

The labelling environment 1100 can be processed to generate a plurality of true and/or false labels for each of the potential goals 1105A-D based on the recorded trajectory 1115 for the actor 1110. To do so, a labelling computing system can determine a mean cross-track distance from the recorded trajectory 1115 to each of the potential goals 1105A-D. The mean cross-track distance, for example, can include an average distance from each respective waypoint of the recorded trajectory 1115 to each waypoint of a goal path of a respective potential goal.

By way of example, the labelling computing system can determine a plurality of waypoints for the recorded trajectory 1115. Each of the plurality of waypoints can include a respective position of the actor 1110 at a respective time. The labelling computing system can determine one or more first distances between a first waypoint of the recorded trajectory 1115 and a respective first waypoint for each of the potential goals 1105A-D. The first waypoint(s) can correspond to a first time. The labelling computing system can determine another distance between the next waypoint of the recorded trajectory 1115 and the respective next waypoint for each of the potential goals 1105A-D. The next waypoints, for example, can correspond to a second time subsequent to the first time. This process can be repeated for each of the plurality of waypoints of the recorded trajectory 1115. The mean cross-track distance between the recorded trajectory 1115 and a respective potential goal can include the average distance between each waypoint of the recorded trajectory 1115 and each corresponding waypoint of the respective potential goal.

The labelling computing system can compare the mean cross-track distance between the recorded trajectory 1115 and each of the potential goals 1105A-D to a threshold distance. In the event that the mean cross-track distance between the recorded trajectory 1115 and a particular goal 1105A is less than the threshold distance, the labelling computing system can label the particular goal 1105A as the true goal. In the event that the mean cross-track distance between the recorded trajectory 1115 and other goals 1105B-D is greater than the threshold distance, the labelling computing system can label the other goals 1105B-D as false goals. The particular goal 1105A labeled as the true goal can identify the potential goal of the environment 1100 towards which the actor 1110 intended to move.

The threshold distance can be any distance. In some implementations, the threshold distance can be determined based on the labelling environment. For instance, the threshold distance can be based on map data corresponding to the labelling environment. By way of example, the threshold distance can be half of the width of the respective lanes corresponding to the potential goals 1105A-D.

In some implementations, a potential goal can be labeled true in the event that the recorded trajectory 1115 of the actor 1110 is close to a goal path of the potential goal for at least 50% of its observed future (e.g., a range of time covered by the training sequence). By way of example, in the labelling environment 1100, the actor 1110 can make a right turn that follows the goal path for the particular goal 1105A. As a result, the particular goal 1105A for the right turn can be labeled true and the other potential goals can be labeled as false.

Labelled training data can include data associated with the labelled environment 110 and can be used to train at least a portion of the machine-learned forecasting model 706. For example, labelled goals (e.g., labelled as true or false) can be used to train the portion of the machine-learned forecasting model 706 that generates goal probabilities (e.g., decoder portion 730). The machine-learned forecasting model 706 can be trained using training data based on data associated with the labelled environment as described, for example, with reference to FIGS. 15 and 16.

Figure 12:
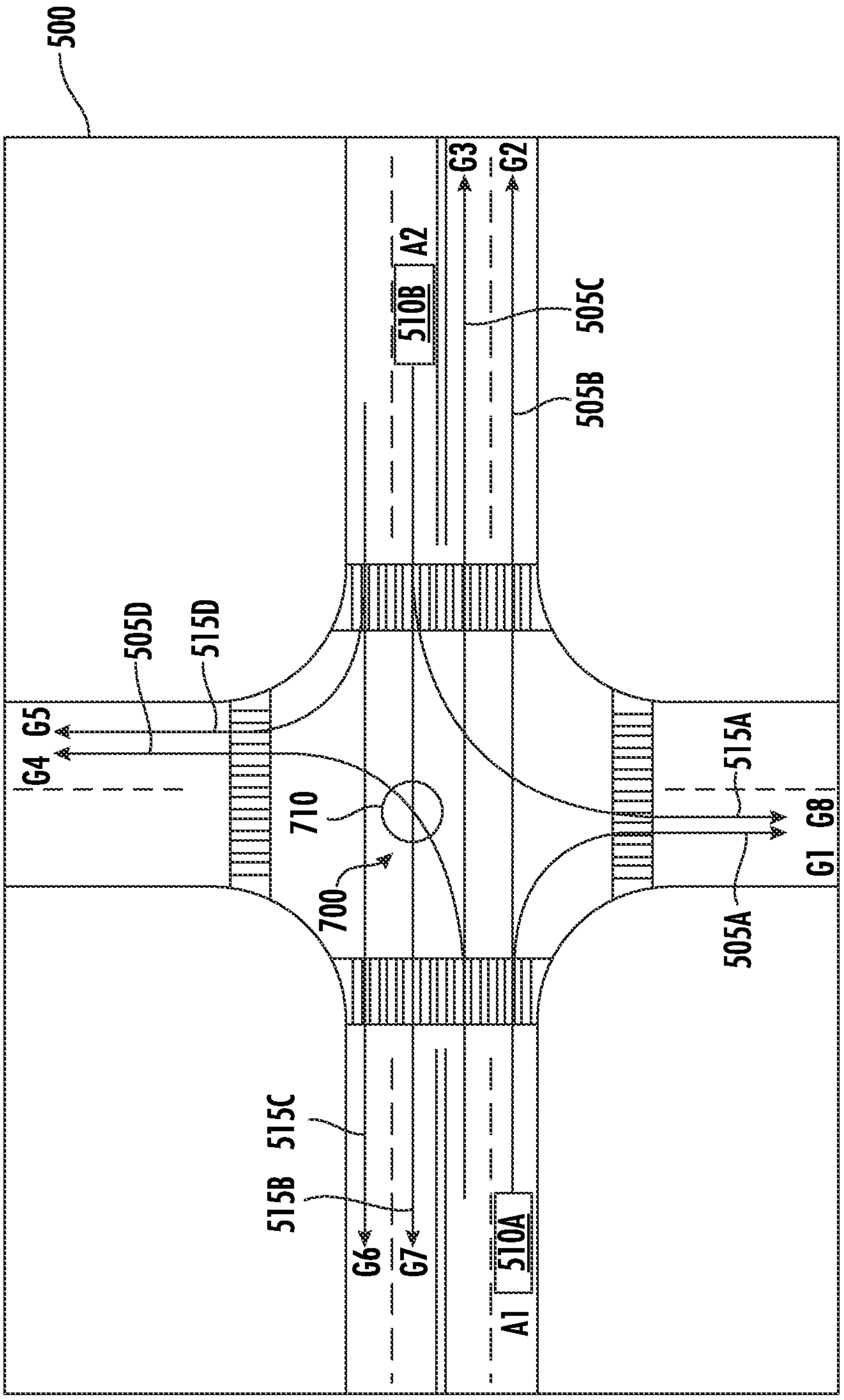
FIG. 12 is an example diagram of generating labelled training data for training a machine-learned forecasting model, according to some implementations of the present disclosure.

Labelled training data can be generated for training the machine-learned forecasting model 706 to predict interaction types. FIG. 12 is an example diagram of a potential interaction 700, according to some implementations of the present disclosure. The potential interaction 700 can be based on the plurality of first potential goals 505A-D for the first actor 510A and the plurality of second potential goals 515A-D for the second actor 510B. The potential interaction 700 can define the temporal aspect of a respective actor's intent. For instance, the potential interaction 700 between the actors 510A-B can describe how each actor will act in relation to each other. In this example, the first and second actors 510A-B can be real actors (as shown in recorded log data) or simulated actors.

The interaction 700 can be identified based on a shared space 710 between the first actor 510A and the second actor 510B. The shared space 710 can include a region of space that both the first actor 510A and the second actor 510B intend to occupy in accordance with a respective potential goal. By way of example, the shared space 710 can be occupied by the first actor 510A in the event that the first actor 510A decides to make a left turn in accordance with the potential goal 505D. The shared space will also be occupied by the second actor 510B in the event that the second actor 510B decides to continue straight in accordance with the potential goal 515B.

Training data can be labelled with a discrete interaction type for the potential interaction 700. The discrete interaction type can include a yield or reverse yield interaction type based on which actor is predicted to reach the shared space 710 first. For example, the actor that reaches the shared space 710 first can be labelled a reverse yielding interaction type and the actor that reaches the shared space 710 second can be labelled a yielding interaction type. The timing at which each actor reaches the shared space 710 can be based on the state data (e.g., speed, location, etc.) for the first actor 510A and the second actor 510B and/or map data (e.g., right of way, traffic signal states, etc.) for the environment 500. A third interaction category can include an ignore category that can be designated in the event that there is no shared space between two potential goal(s) of the first actor 510A and the second actor 510B (e.g., goals 505A and 515D).

Figure 15:
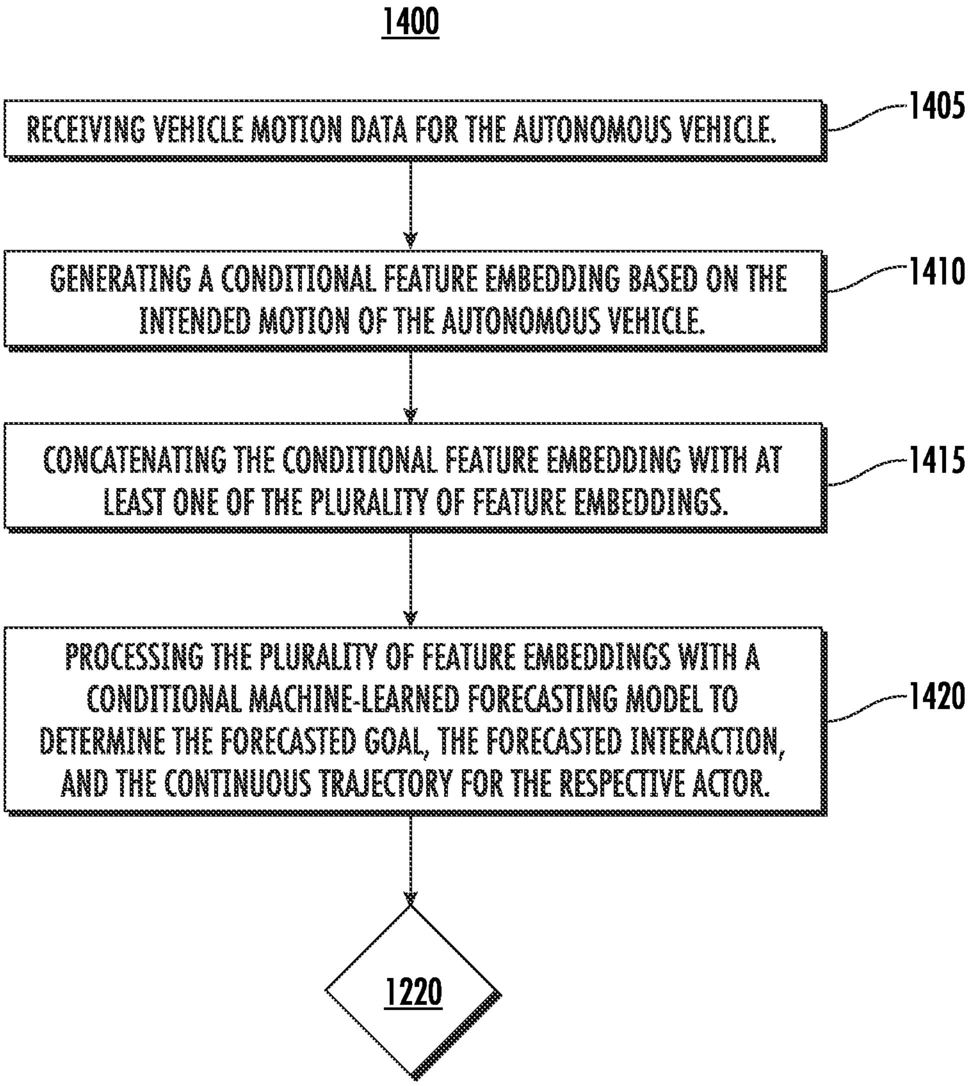
FIG. 15 is a flowchart of an example method for processing data with a machine-learned forecasting model, according to some implementations of the present disclosure.
Figure 16:
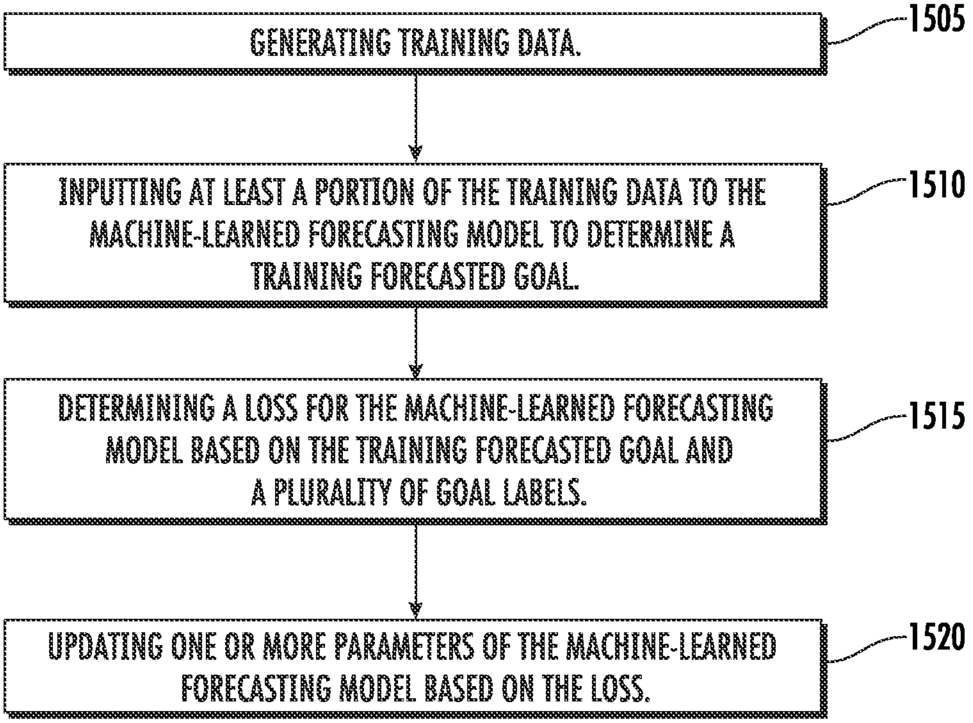
FIG. 16 is a flowchart of an example method for training a machine-learned forecasting model, according to some implementations of the present disclosure.

The labelled training data of FIG. 12 can be used to train the machine-learned forecasting model (e.g., in accordance with the processes FIGS. 15 and 16). This can allow the forecasting system to, for example, utilize discrete interaction categories (e.g., reverse yield, yield, ignore) to describe the behavior of the first and second actors 510A-B with respect to each other and their potential goals.

Figure 13:
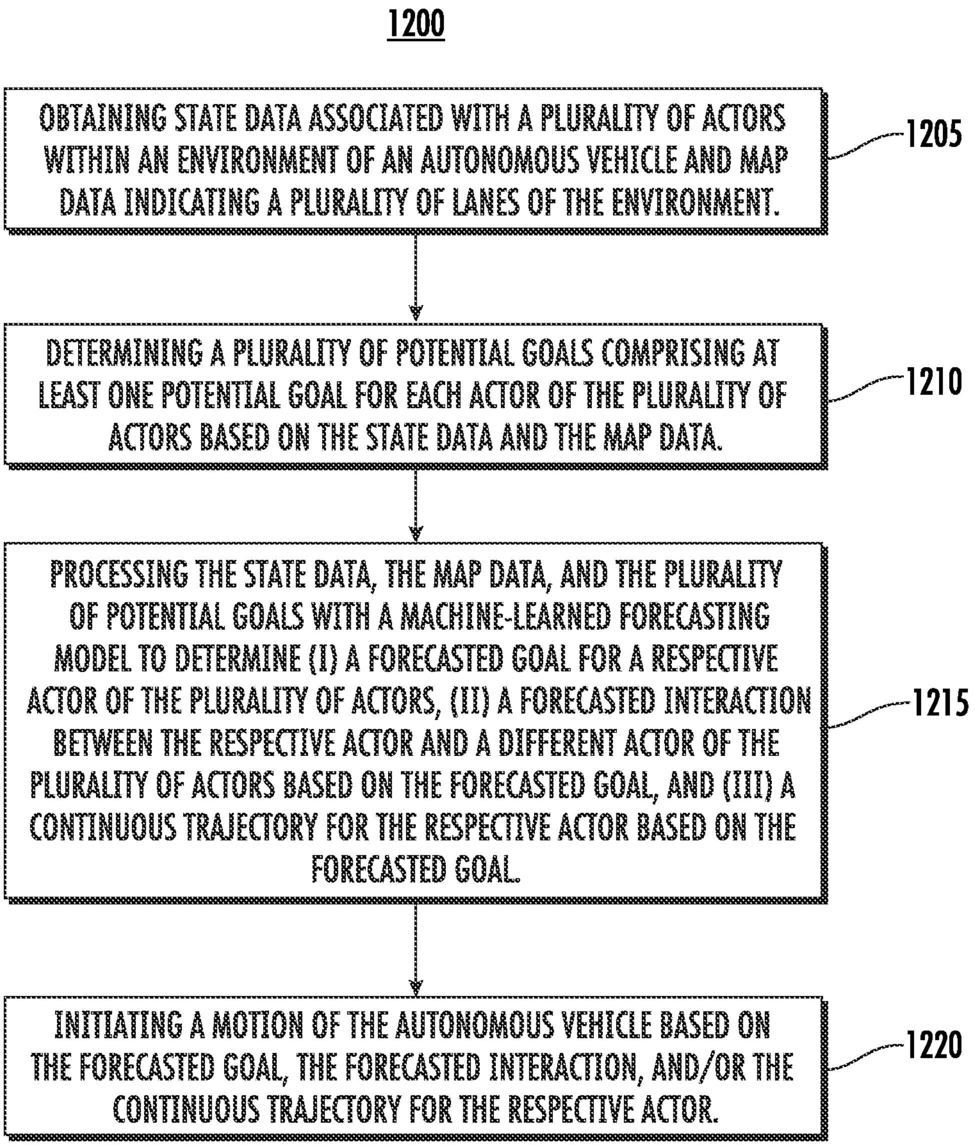
FIG. 13 is a flowchart of an example method for initiating the motion of an autonomous vehicle, according to some implementations of the present disclosure.

FIG. 13 is a flowchart of a method 1200 for initiating the motion of an autonomous vehicle, according to some implementations of the present disclosure. The method 1200 can be performed by a computing system that includes one or more computing devices such as, for example, the computing systems described with reference to the other figures (e.g., autonomous platform, autonomy system, forecasting system, etc.). Each respective portion of the method 1200 can be performed by any (or any combination) of one or more computing devices. Moreover, one or more portion(s) of the method 1200 can be implemented as an algorithm on the hardware components of the device(s) described herein (e.g., as in FIGS. 1-2, 4, 7, 18, etc.), for example, to perform actor intent prediction as discussed herein. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of method 1200 can be performed additionally, or alternatively, by other systems.

At 1205, the method 1200 includes obtaining state data associated with a plurality of actors within an environment of an autonomous vehicle and map data indicating a plurality of lanes of the environment.

The state data can include a plurality of actor states associated with a respective actor. The plurality of actor states can be indicative of one or more positions, one or more velocities, and/or one or more headings for the respective actor at a current time and one or more historical times.

At 1210, the method 1200 includes determining a plurality of potential goals including at least one potential goal for each actor of the plurality of actors based on the state data and the map data. A potential goal can include a potential destination location in the environment and a goal path to the potential destination location. The potential goal, for example, can include a future location defined by the map data.

In some implementations, the goal path of the potential goal can include a nominal path defined in the map data. For instance, the map data can include a plurality of map features associated with the potential goal. The plurality of map features can include a plurality of waypoints for the nominal path defined in the map data At 1215, the method 1200 includes processing the state data, the map data, and the plurality of potential goals with a machine-learned forecasting model to determine (i) a forecasted goal (e.g., expressed goal probabilities) for a respective actor of the plurality of actors, (ii) a forecasted interaction (e.g., expressed as interaction probabilities) between the respective actor and a different actor of the plurality of actors based on the forecasted goal, and (iii) a continuous trajectory for the respective actor based on the forecasted goal.

In some implementations, the machine-learned forecasting model can determine a probability for each potential goal for the respective actor. The forecasted goal may be a respective potential goal that has a highest probability.

The forecasted interaction can be based on a potential goal for the different actor that intersects the forecasted goal for the respective actor in the environment. The forecasted interaction is indicative of a probability of the forecasted interaction between the respective actor and the different actor. For example, the forecasted interaction can be a probability distribution over one or more interaction types (e.g., yield, reverse yield, ignore, unknow). The probability distribution can be based on one or more distances between the respective actor and a shared space associated with the forecasted goal and the potential goal for the different actor.

At 1220, the method 1200 includes initiating a motion of the autonomous vehicle based on the forecasted goal, the forecasted interaction, and/or the continuous trajectory for the respective actor. For instance, the computing system can initiate a motion of the autonomous vehicle based on the forecasted goal, the forecasted interaction, and/or the continuous trajectory for the respective actor.

Figure 14:
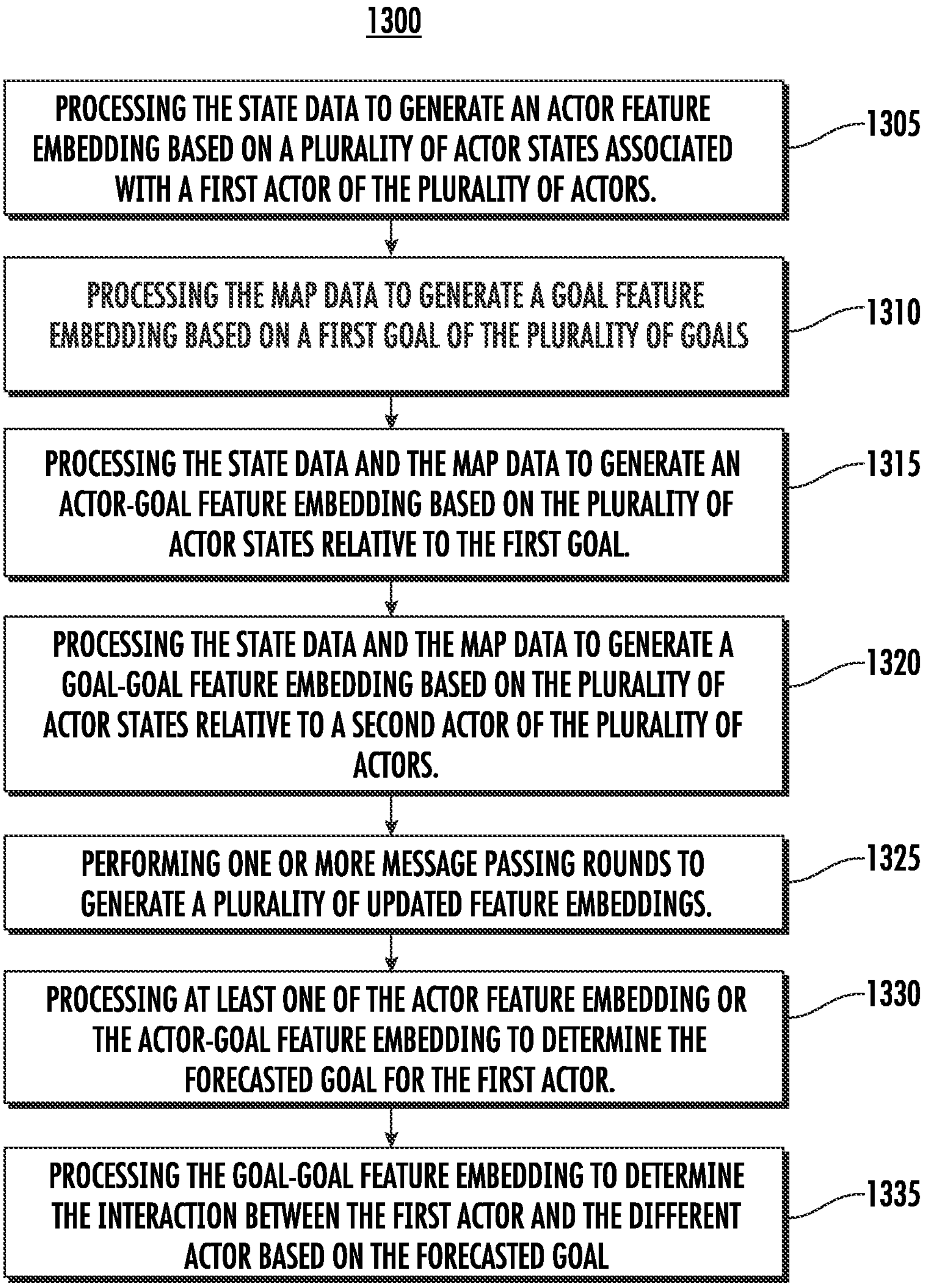
FIG. 14 is a flowchart of an example method for processing data with a machine-learned forecasting model, according to some implementations of the present disclosure.

FIG. 14 is a flowchart of a method 1300 for processing data with a machine-learned forecasting model, according to some implementations of the present disclosure. The method 1300 can be performed by a computing system that includes one or more computing devices such as, for example, the computing systems described with reference to the other figures (e.g., autonomous platform, autonomy system, forecasting system, etc.). Each respective portion of the method 1300 can be performed by any (or any combination) of one or more computing devices. Moreover, one or more portion (s) of the method 1300 can be implemented as an algorithm on the hardware components of the device(s) described herein (e.g., as in FIGS. 1-2, 4, 7, 18, etc.), for example, to process information with a machine-learned intent model as discussed herein. FIG. 14 depicts elements performed in a particular order for purposes of illustration and discussion.

Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of method 1300 can be performed additionally, or alternatively, by other systems.

The method 1300 can include suboperations of operation 1215 of FIG. 13 where the method 1200 includes processing the state data, the map data, and the plurality of potential goals with the machine-learned forecasting model to determine the forecasted goal, the forecasted interaction, and the continuous trajectory.

At 1305, the method 1300 includes processing the state data to generate an actor feature embedding based on a plurality of actor states associated with a first actor of the plurality of actors.

At 1310, the method 1300 includes processing the map data to generate a goal feature embedding based on a first goal of the plurality of goals. The goal feature embedding can encode a plurality of map features associated with the first potential goal. By way of example, the plurality of map features can include map features (e.g., location, right of way, etc.) corresponding to each of a plurality of waypoints of the goal path for the potential goal.

At 1315, the method 1300 includes processing the state data and the map data to generate an actor-goal feature embedding based on the plurality of actor states relative to the first goal path.

At 1320, the method 1300 includes processing the state data and the map data to generate a goal-goal feature embedding based on the plurality of actor states relative to a second actor of the plurality of actors.

At 1325, the method 1300 includes performing one or more message passing rounds to generate a plurality of updated feature embeddings.

By way of example, each of the feature embeddings can be associated with a node and/or edge of graph neural network. For instance, the machine-learned forecasting model can include a graph neural network including a plurality of nodes and a plurality of edges. The plurality of nodes can include: (i) a plurality of actor nodes respectively corresponding to each actor of the plurality of actors; and (ii) a plurality of goal nodes respectively corresponding to each potential goal of the plurality of potential goals. The plurality of edges can include: (i) one or more actor-goal edges respectively connecting a respective actor node and a respective goal node; and (ii) one or more goal-goal edges respectively connecting at least two goal nodes of the plurality of goal nodes. During each message passing round, each node and edge of the neural graph network can share information with adjacent nodes and/or edges. As described herein, the machine-learned forecasting model can utilize learned model(s)/function(s) (e.g., a goal-goal edge model, an actor-goal edge model, a goal node model) to perform message passing that allows the sharing of feature information across nodes/edges.

At 1330, the method 1300 includes processing at least one of the actor feature embedding or the actor-goal feature embedding to determine the forecasted goal for the first actor.

At 1335, the method 1300 includes processing the goal-goal feature embedding to determine the interaction between the first actor and the different actor based on the forecasted goal.

In addition, or alternatively, the plurality of feature embeddings can be processed with a conditional machine-learned intent prediction system according the example method 1400.

FIG. 15 is a flowchart of another example method 1400 for processing data with a machine-learned forecasting model, according to some implementations of the present disclosure. The method 1400 can be performed by a computing system that includes one or more computing devices such as, for example, the computing systems described with reference to the other figures (e.g., autonomous platform, autonomy system, intent prediction system, etc.). Each respective portion of the method 1400 can be performed by any (or any combination) of one or more computing devices. Moreover, one or more portion(s) of the method 1400 can be implemented as an algorithm on the hardware components of the device(s) described herein (e.g., as in FIGS. 1-2, 4, 7, 18, etc.), for example, to process information with a machine-learned intent model as discussed herein. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of method 1400 can be performed additionally, or alternatively, by other systems.

The method 1400 can include suboperations of operation 1215 of FIG. 13 where the method 1200 includes processing the state data, the map data, and the plurality of potential goals with the machine-learned forecasting model to determine the forecasted goal, the forecasted interaction, and the continuous trajectory. For example, the method 1400 can include operations that can be performed concurrently with operations 1305-1325 of FIG. 14 where the method 1300 includes performing one or more message passing rounds to generate a plurality of updated feature embeddings. The method 1400 can include operations that can be performed before operation 1220 of FIG. 13 where the method 1200 includes initiating a motion of the autonomous vehicle based on the forecasted goal, the forecasted interaction, and/or the continuous trajectory for the respective actor.

At 1405, the method 1400 includes receiving vehicle motion data for the autonomous vehicle. The vehicle motion data can be indicative of a potential motion of the autonomous vehicle. By way of example, the vehicle motion data can be indicative of a potential goal that has been selected for implementations by the autonomous vehicle.

At 1410, the method 1400 includes generating a conditional feature embedding based on the intended motion of the autonomous vehicle.

At 1415, the method 1400 includes concatenating the conditional feature embedding with at least one of the plurality of feature embeddings.

At 1420, the method 1400 includes processing the plurality of feature embeddings with the machine-learned forecasting model to determine the forecasted goal, the forecasted interaction, and the continuous trajectory for the respective actor. For example, a computing system can process the plurality of feature embeddings with the machine-learned conditional prediction model to determine the forecasted goal, the forecasted interaction, and the continuous trajectory for the respective actor.

FIG. 16 is a flowchart of an example method 1500 for training a machine-learned forecasting model, according to some implementations of the present disclosure. The method 1500 can be performed by a computing system that includes one or more computing devices such as, for example, the computing systems described with reference to the other figures (e.g., autonomous platform, autonomy systems, intent prediction system, etc.). Each respective portion of the method 1500 can be performed by any (or any combination) of one or more computing devices. Moreover, one or more portion(s) of the method 1500 can be implemented as an algorithm on the hardware components of the device(s) described herein (e.g., as in FIGS. 1-2, 4, 7, 18, etc.), for example, to train a machine-learned intent model as discussed herein. FIG. 16 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 16 is described with reference to elements/terms described with respect to other systems and figures for exemplary illustrated purposes and is not meant to be limiting. One or more portions of method 1500 can be performed additionally, or alternatively, by other systems.

At 1505, the method 1500 includes generating or obtaining training data. For example, a computing system (e.g., autonomous platform, autonomy systems, intent prediction system, etc.) can generate the training data, or the training data may be obtained from a real-world log. The training data can include labeled training data such as, for example, data associated with the labelling environments described herein. The labeled training data can identify a plurality actors, a plurality of potential goals for each actor, and whether each actor decides to act in accordance with each of the respective goals. In some implementations, the training data can include previously recorded training environments.

At 1510, the method 1500 includes inputting at least a portion of the training data to the machine-learned forecasting model to determine a training forecasted goal. For example, the computing system (e.g., autonomous platform, autonomy systems, intent prediction system, etc.) can input at least the portion of the training data to the machine-learned forecasting model to determine the training forecasted goal.

At 1515, the method 1500 includes determining a loss for the machine-learned forecasting model based on the training forecasted goal and a plurality of goal labels. For example, the computing system (e.g., autonomous platform, autonomy systems, intent prediction system, etc.) can determining the loss for the machine-learned forecasting model based on the training forecasted goal and the plurality of goal labels.

At 1520, the method 1500 includes updating one or more parameters of the machine-learned forecasting model based on the loss. For example, the computing system can update the one or more parameters of the machine-learned forecasting model based on the loss.

Figure 17:
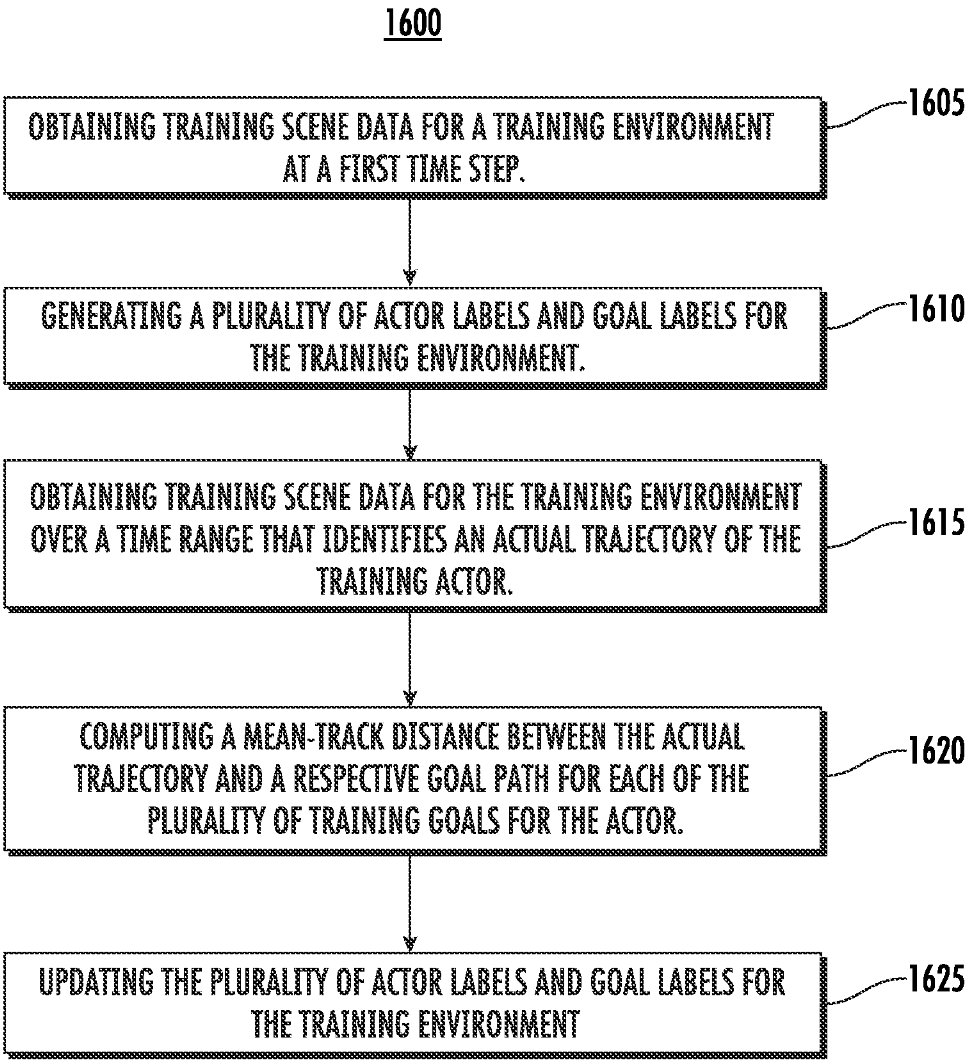
FIG. 17 is a flowchart of an example method for generating training data, according to some implementations of the present disclosure.

FIG. 17 is a flowchart of an example method 1600 for generating training data, according to some implementations of the present disclosure. The method 1600 can be performed by a computing system that includes one or more computing devices such as, for example, the computing systems described with reference to the other figures (e.g., autonomous platform, autonomy systems, intent prediction system, etc.). Each respective portion of the method 1600 can be performed by any (or any combination) of one or more computing devices. Moreover, one or more portion(s) of the method 1600 can be implemented as an algorithm on the hardware components of the device(s) described herein (e.g., as in FIGS. 1-2, 4, 7, 18, etc.), for example, to generate training data for a machine-learned intent model as discussed herein. FIG. 17 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 17 is described with reference to elements/terms described with respect to other systems and figures for exemplary illustrated purposes and is not meant to be limiting. One or more portions of method 1600 can be performed additionally, or alternatively, by other systems.

At 1605, the method 1600 includes obtaining training scene data for a training environment at a first time step. By way of example, the training scene data can include real world data recorded by one or more sensors of an autonomous platform or simulated data.

At 1610, the method 1600 includes generating a plurality of actor labels and goal labels for the training environment. The plurality of goal labels identify a plurality of goals for a training actor.

At 1615, the method 1600 includes obtaining training scene data for the training environment over a time range that identifies an actual trajectory of the training actor.

At 1620, the method 1600 includes computing a mean-track distance between the actual trajectory and a respective goal path for each of the plurality of training goals for the actor.

At 1625, the method 1600 includes updating the plurality of actor labels and goal labels for the training environment.

Figure 18:
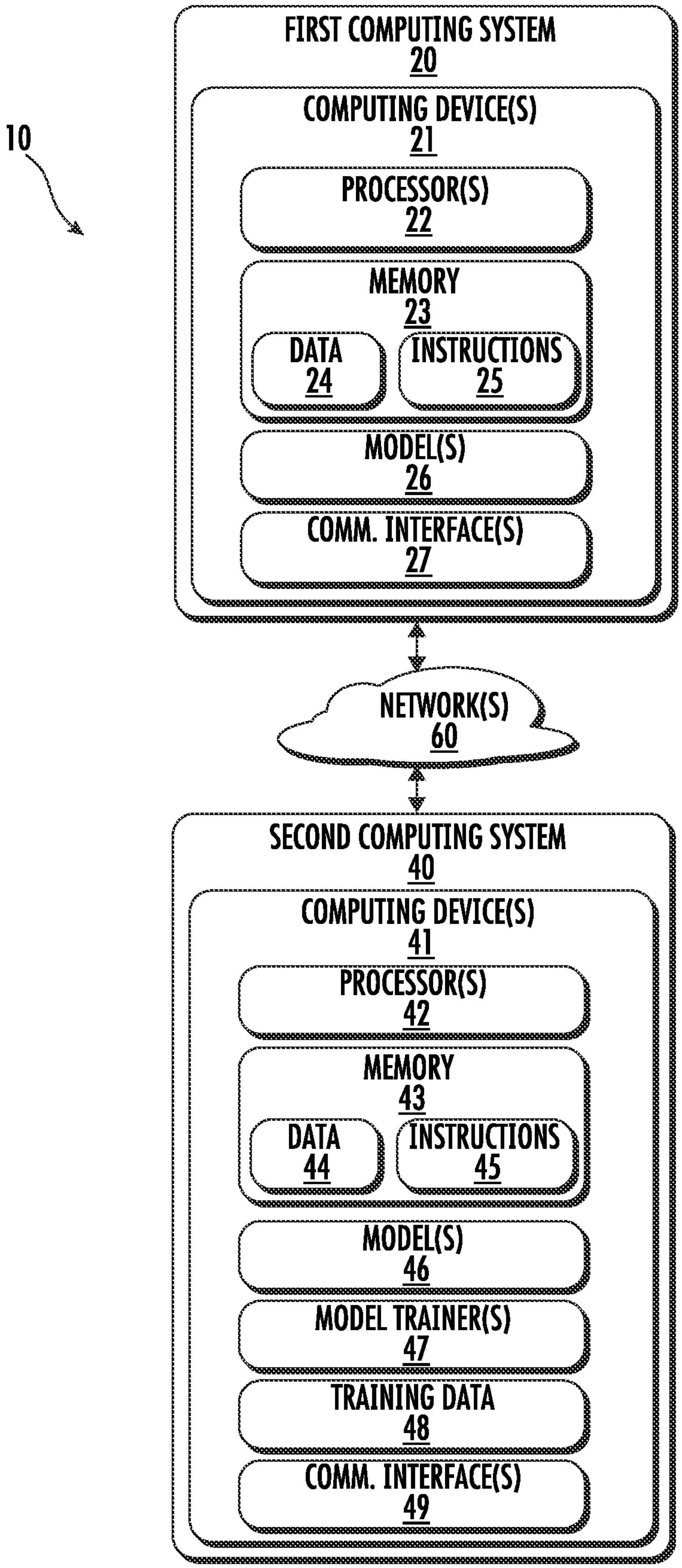
FIG. 18 is a block diagram of a computing system for predicting the intent of one or more objects within an environment, according to some implementations of the present disclosure.

FIG. 18 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein for intent prediction (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. In some implementations, the models 26 can be or can otherwise include one or more machine-learned models. As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

In addition, or alternatively to, the model(s) 26 at the first computing system 20, the second computing system 40 can include one or more models 46. As examples, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 18 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. In addition, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method, comprising:

(a) obtaining state data associated with a plurality of actors within an environment of an autonomous vehicle and map data indicating a plurality of lanes of the environment;

(b) determining a plurality of potential goals comprising at least one potential goal for each actor of the plurality of actors based on the state data and the map data, wherein a potential goal comprises a potential destination location in the environment and a goal path to the potential destination location;

(c) processing the state data, the map data, and the plurality of potential goals with a machine-learned forecasting model to generate a plurality of feature embeddings for respective nodes in a graph neural network corresponding to the plurality of actors and the plurality of potential goals, the plurality of feature embeddings indicative of respective distances between a set of the plurality of actors and a shared space distinct from spaces corresponding to the plurality of actors and corresponding to an intersection of goal paths associated with the set of the plurality of actors;

(d) processing the plurality of feature embeddings to determine a forecasted goal for a respective actor of the plurality of actors and a continuous trajectory for the respective actor based on the forecasted goal; and (e) initiating a motion of the autonomous vehicle based on the forecasted goal and the continuous trajectory of the respective actor.

2. The computer-implemented method of claim 1, wherein the respective nodes corresponding to the plurality of actors and the plurality of potential goals comprise:

actor nodes respectively including an actor feature representation encoded based on a current state and one or more historical states of a particular actor; and goal nodes respectively including a goal feature representation encoded based on waypoint information for a corresponding goal path.

3. The computer-implemented method of claim 2, wherein the graph neural network further comprises one or more actor-goal edges respectively connecting a respective actor node and a respective goal node.

4. The computer-implemented method of claim 2, wherein the graph neural network further comprises one or more goal-goal edges respectively connecting at least two goal nodes of the respective nodes corresponding to the plurality of potential goals.

5. The computer-implemented method of claim 1, wherein the plurality of feature embeddings comprises an actor feature embedding corresponding to an actor node, a goal feature embedding corresponding to a goal node, an actor-goal feature embedding corresponding to an actor-goal edge, and a goal-goal feature embedding corresponding to a goal-goal edge.

6. The computer-implemented method of claim 1, further comprising determining a probability for each potential goal for the respective actor, wherein the forecasted goal comprises a respective potential goal that has a highest probability.

7. The computer-implemented method of claim 1, wherein the goal path of the at least one potential goal comprises a nominal path defined in the map data.

8. The computer-implemented method of claim 1, wherein the at least one potential goal for each actor comprises a plurality of potential goals for the actor, and wherein the forecasted goal has an optimized probability based on evaluating probabilities indicative of a likelihood that the respective actor will follow respective goal paths associated with the plurality of potential goals.

9. The computer-implemented method of claim 1, wherein (d) further comprises:

processing the plurality of feature embeddings to determine a forecasted interaction between the respective actor and a different actor of the plurality of actors based on the forecasted goal.

10. The computer-implemented method of claim 9, wherein the forecasted interaction is further based on a potential goal for the different actor that intersects the forecasted goal for the respective actor in the environment.

11. The computer-implemented method of claim 10, wherein the forecasted interaction comprises a probability distribution over one or more interaction types between the respective actor and the different actor.

12. The computer-implemented method of claim 10, wherein a probability of the forecasted interaction between the respective actor and the different actor is based on one or more distances between the respective actor and a shared space associated with the forecasted goal and the potential goal for the different actor.

13. The computer-implemented method of claim 1, further comprising:

performing one or more message passing rounds to generate a plurality of updated feature embeddings; and determining the forecasted goal and the continuous trajectory for the respective actor based on the plurality of updated feature embeddings.

14. A computing system comprising:

one or more processors; and one or more non-transitory computer-readable media storing instructions that are executable to cause the one or more processors to perform operations, the operations comprising:

(a) obtaining state data associated with a plurality of actors within an environment of an autonomous vehicle and map data indicating a plurality of lanes of the environment;

(b) determining a plurality of potential goals comprising at least one potential goal for each actor of the plurality of actors based on the state data and the map data, wherein a potential goal comprises a potential destination location in the environment and a goal path to the potential destination location;

(c) processing the state data, the map data, and the plurality of potential goals with a machine-learned forecasting model to generate a plurality of feature embeddings for respective nodes in a graph neural network corresponding to the plurality of actors and the plurality of potential goals, the plurality of feature embeddings indicative of respective distances between a set of the plurality of actors and a shared space distinct from spaces corresponding to the plurality of actors and corresponding to an intersection of goal paths associated with the set of the plurality of actors;

(d) processing the plurality of feature embeddings to determine a forecasted goal for a respective actor of the plurality of actors and a continuous trajectory for the respective actor based on the forecasted goal; and (e) initiating a motion of the autonomous vehicle based on the forecasted goal and the continuous trajectory of the respective actor.

15. The computing system of claim 14, wherein the respective nodes corresponding to the plurality of actors and the plurality of potential goals comprise:

actor nodes respectively including an actor feature representation encoded based on a current state and one or more historical states of a particular actor; and goal nodes respectively including a goal feature representation encoded based on waypoint information for a corresponding goal path.

16. The computing system of claim 15, wherein the graph neural network further comprises one or more actor-goal edges respectively connecting a respective actor node and a respective goal node.

17. The computing system of claim 15, wherein the graph neural network further comprises one or more goal-goal edges respectively connecting at least two goal nodes of the respective nodes corresponding to the plurality of potential goals.

18. The computing system of claim 14, the operations further comprising:

performing one or more message passing rounds to generate a plurality of updated feature embeddings; and determining the forecasted goal and the continuous trajectory for the respective actor based on the plurality of updated feature embeddings.

19. The computing system of claim 14, wherein (d) comprises:

processing the plurality of feature embeddings to determine: (i) a forecasted goal for a respective actor of the plurality of actors; (ii) a forecasted interaction between the respective actor and a different actor of the plurality of actors based on the forecasted goal; and (iii) a continuous trajectory for the respective actor based on the forecasted goal and the forecasted interaction.

20. A control system for an autonomous vehicle, the control system comprising:

one or more processors; and one or more non-transitory computer-readable media storing instructions that are executable to cause the one or more processors to perform operations, the operations comprising:

(a) obtaining state data associated with a plurality of actors within an environment of an autonomous vehicle and map data indicating a plurality of lanes of the environment;

(b) determining a plurality of potential goals comprising at least one potential goal for each actor of the plurality of actors based on the state data and the map data, wherein a potential goal comprises a potential destination location in the environment and a goal path to the potential destination location;

(c) processing the state data, the map data, and the plurality of potential goals with a machine-learned forecasting model to generate a plurality of feature embeddings for respective nodes in a graph neural network corresponding to the plurality of actors and the plurality of potential goals, the plurality of feature embeddings indicative of respective distances between a set of the plurality of actors and a shared space distinct from spaces corresponding to the plurality of actors and corresponding to an intersection of goal paths associated with the set of the plurality of actors;

(d) processing the plurality of feature embeddings to determine a forecasted goal for a respective actor of the plurality of actors and a continuous trajectory for the respective actor based on the forecasted goal; and (e) initiating a motion of the autonomous vehicle based on the forecasted goal and the continuous trajectory of the respective actor.

* * * * *